(12) United States Patent
Ramamurthy et al.

(10) Patent No.: US 10,171,819 B2
(45) Date of Patent: Jan. 1, 2019

(54) INTRA PREDICTION MODE SELECTION IN VIDEO CODING

(71) Applicant: ARRIS Enterprises LLC, Suwanee, GA (US)

(72) Inventors: Shailesh Ramamurthy, Bengaluru (IN); Anil Kumar Nellore, Bangalore (IN); Padmassri Chandrashekar, Bangalore (IN); Padmagowri Pichumani, Bangalore (IN)

(73) Assignee: ARRIS Enterprises LLC, Suwanee, GA (US)

( * ) Notice: Subject to any disclaimer, the term of this patent is extended or adjusted under 35 U.S.C. 154(b) by 227 days.

(21) Appl. No.: 15/227,492

(22) Filed: Aug. 3, 2016

(65) Prior Publication Data

US 2017/0041616 A1 Feb. 9, 2017

Related U.S. Application Data

(60) Provisional application No. 62/200,293, filed on Aug. 3, 2015.

(51) Int. Cl.
| | |
|---|---|
| *H04N 19/176* | (2014.01) |
| *H04N 19/147* | (2014.01) |
| *H04N 19/11* | (2014.01) |
| *H04N 19/154* | (2014.01) |

(52) U.S. Cl.
CPC ........... *H04N 19/176* (2014.11); *H04N 19/11* (2014.11); *H04N 19/147* (2014.11); *H04N 19/154* (2014.11)

(58) Field of Classification Search
CPC .... H04N 19/176; H04N 19/11; H04N 19/147; H04N 19/154
See application file for complete search history.

(56) References Cited

U.S. PATENT DOCUMENTS

| | | | |
|---|---|---|---|
| 7,706,443 B2 | 4/2010 | Chandramouly et al. | |
| 9,473,778 B2* | 10/2016 | Chou | H04N 19/105 |
| 9,613,254 B1* | 4/2017 | Sarachan | G06K 9/00147 |
| 9,770,461 B2* | 9/2017 | Oh | A61K 31/7028 |
| 2006/0203916 A1* | 9/2006 | Chandramouly | H04N 19/176 375/240.24 |
| 2015/0358626 A1* | 12/2015 | Kusano | H04N 19/159 382/233 |

\* cited by examiner

*Primary Examiner* — Nhon T Diep
(74) *Attorney, Agent, or Firm* — Thomas A. Ward

(57) ABSTRACT

A method is provided for encoding a digital video with a video encoder that allows intra prediction of mode selection. The method includes dividing pixels from each intra prediction block into four groups based on phases of the pixels, progressively narrowing down a list of intra prediction modes over a series of stages based on a comparison of a cost value for each intra prediction mode at that stage against a threshold value, tentatively assigning the remaining intra prediction with the lowest cost value after the final stage to the block, calculating a heterogeneity index for each group of contiguous intra prediction blocks based on the tentative intra prediction mode selected for each block after the final stage, and finalizing the tentative intra prediction mode for each block if the group has a heterogeneity index above a predetermined threshold value.

5 Claims, 21 Drawing Sheets

Cost for each considered intra prediction mode & block size:

$$Cost_{Group:i} = SATD_i + P*(\lambda(Q_p))*R + Cost_{Group:(i-1)}$$

Where:
    i = Group Number
    $Cost_{Group:0} = 0$
    P = 0 if intra prediction mode is most probable
    P = 1 if intra prediction mode not most probable

FIG. 8

Threshold Maximum Cost for Stage:

$$T_i = Cost_{Group:i}(min) + i * Range_i * S_i$$

Where:
    i = Stage Number
    $Range_1 = (Cost_{Group:1}(max) - Cost_{Group:1}(min))$
    $0 < S_n < ... < S_2 < S_1 < 1$

| Test Embodiment A: 16x16 Intra Prediction Mode Decision ||||| 
|---|---|---|---|---|
| Quantization Parameter (QP) | Reference Encoding Scheme's Number of Mode Evaluation Operations | Test Embodiment A's Number of Mode Evaluation Operations | Test Embodiment A's Percentage Savings for Number of Mode Evaluation Operations | Test Embodiment A's Percentage Savings in Intra Prediction Mode Decision Time |
| 27 | 48384000 | 24503085 | 49.35704985 | 51.13627204 |
| 30 | 48384000 | 24280072 | 49.81797288 | 51.28259208 |
| 32 | 48384000 | 24321047 | 49.7332858 | 51.25570816 |
| 37 | 48384000 | 25526677 | 47.24149099 | 50.46468777 |
| Average Percentage Savings: ||| 49.03744988 | 51.03481502 |

| Test Embodiment A: 32x32 Intra Prediction Mode Decision |||||
|---|---|---|---|---|
| Quantization Parameter (QP) | Reference Encoding Scheme's Number of Mode Evaluation Operations | Test Embodiment A's Number of Mode Evaluation Operations | Test Embodiment A's Percentage Savings for Number of Mode Evaluation Operations | Test Embodiment A's Percentage Savings in Intra Prediction Mode Decision Time |
| 27 | 12096000 | 6329319 | 47.67428075 | 74.69753936 |
| 30 | 12096000 | 6263047 | 48.22216435 | 74.76350913 |
| 32 | 12096000 | 6190453 | 48.82231316 | 74.83577206 |
| 37 | 12096000 | 6069762 | 49.82008929 | 74.95591265 |
| Average Percentage Savings: ||| 48.63471189 | 74.8131833 |

FIG. 19

| Test Embodiment B: 16x16 Intra Prediction Mode Decision ||||||
|---|---|---|---|---|---|
| QP | Number of 16x16 Blocks Finalized Early Due to Heterogeneity Index | Reference Encoding Scheme's Number of Rate Distortion Operations | Test Embodiment B's Number of Rate Distortion Operations | Test Embodiment B's Percentage Savings in Number of Rate Distortion Operations | Test Embodiment B's Percentage Savings in Intra Prediction Mode Decision Time |
| 27 | 352689 | 4147200 | 3089133 | 25.51280382 | 42.9021663 |
| 30 | 297144 | 4147200 | 3255768 | 21.49479167 | 39.8221767 |
| 32 | 265414 | 4147200 | 3350958 | 19.1995081 | 38.06273714 |
| 37 | 200372 | 4147200 | 3546084 | 14.49450231 | 34.45613558 |
| Average Percentage Savings: |||| 20.17540148 | 38.81080393 |

| Test Embodiment B: 32x32 Intra Prediction Mode Decision ||||||
|---|---|---|---|---|---|
| QP | Number of 32x32 Blocks Finalized Early Due to Heterogeneity Index | Reference Encoding Scheme's Number of Rate Distortion Operations | Test Embodiment B's Number of Rate Distortion Operations | Test Embodiment B's Percentage Savings in Number of Rate Distortion Operations | Test Embodiment B's Percentage Savings in Intra Prediction Mode Decision Time |
| 27 | 259077 | 1036800 | 259569 | 74.96440972 | 80.80907802 |
| 30 | 240466 | 1036800 | 315402 | 69.57928241 | 76.68113229 |
| 32 | 227052 | 1036800 | 355644 | 65.69791667 | 73.70588839 |
| 37 | 188418 | 1036800 | 471546 | 54.51909722 | 65.13681335 |
| Average Percentage Savings: |||| 66.1901765 | 74.08322801 |

FIG. 20

| Test Embodiment C: 16x16 Intra Prediction Mode Decision ||||||
|---|---|---|---|---|---|
| QP | Number of 16x16 Blocks Finalized Early Due to Heterogeneity Index | Reference Encoding Scheme's Number of Rate Distortion Operations | Test Embodiment B's Number of Rate Distortion Operations | Test Embodiment B's Percentage Savings in Number of Rate Distortion Operations | Test Embodiment B's Percentage Savings in Intra Prediction Mode Decision Time |
| 27 | 458898 | 4147200 | 923502 | 77.73192 | 71.37809 |
| 30 | 392109 | 4147200 | 990291 | 76.12146 | 69.30812 |
| 32 | 349398 | 4147200 | 1033002 | 75.09158 | 67.98438 |
| 37 | 247317 | 4147200 | 1135083 | 72.63014 | 64.82061 |
| Average Percentage Savings: |||| 74.36031539 | 67.04446379 |

| Test Embodiment C: 32x32 Intra Prediction Mode Decision ||||||
|---|---|---|---|---|---|
| QP | Number of 32x32 Blocks Finalized Early Due to Heterogeneity Index | Reference Encoding Scheme's Number of Rate Distortion Operations | Test Embodiment B's Number of Rate Distortion Operations | Test Embodiment B's Percentage Savings in Number of Rate Distortion Operations | Test Embodiment B's Percentage Savings in Intra Prediction Mode Decision Time |
| 27 | 284374 | 1036800 | 61226 | 94.09471 | 92.40974 |
| 30 | 267165 | 1036800 | 78435 | 92.4349 | 90.27632 |
| 32 | 252732 | 1036800 | 92868 | 91.04282 | 88.48704 |
| 37 | 207759 | 1036800 | 137841 | 86.70515 | 82.91169 |
| Average Percentage Savings: |||| 88.99442998 | 85.85417617 |

FIG. 21

| QP Values Used | Source Sequence | Test Embodiment A BD-Rate % | Test Embodiment B BD-Rate % | Test Embodiment C BD-Rate % | Test Embodiment D BD-Rate % |
|---|---|---|---|---|---|
| 27, 30, 32, 37 | 1 | 7.1 | 1.9 | 9.8 | 10.6 |
| 32, 35, 37, 40 | 2 | 6.6 | 1.3 | 7.7 | 10.2 |
| 20, 22, 27, 29 | 3 | 5.5 | 2.9 | 10.2 | 11 |
| 37, 39, 42, 45 | 4 | 4.8 | 0.7 | 6.5 | 9.6 |
| 40, 42, 45, 47 | 5 | 6.8 | 1.8 | 8.1 | 11 |
| Average BD-Rate % | | 6.16 | 1.72 | 8.46 | 10.48 |
| | | Test Embodiment A | Test Embodiment B | Test Embodiment C | Test Embodiment D |
| Overall Encoding Complexity Percentage Savings | | 48.2% | 16.23% | 46.19% | 54.14% |

INTRA PREDICTION MODE SELECTION IN VIDEO CODING

CLAIM OF PRIORITY

This Application claims priority under 35 U.S.C. § 119(e) from earlier filed U.S. Provisional Application Ser. No. 62/200,293, filed Aug. 3, 2015, which is hereby incorporated by reference.

TECHNICAL FIELD

The present disclosure relates to the field of video coding, particularly a method of selecting intra prediction modes.

BACKGROUND

Video encoders often encode videos into bitstreams using block-based coding which involves breaking pictures into blocks such as coding tree units (CTUs), macroblocks or superblocks. These blocks can be split using defined mechanisms to yield prediction blocks. For instance, in H.264/AVC, a macroblock can be split into multiple prediction blocks called partitions. In H.265/HEVC, a CTU can contain one or multiple coding units (CUs), and each coding unit or block can be partitioned into prediction units/blocks (PU/PBs) and transform units/blocks (TUs). The video can be encoded by forming a prediction of each prediction block using intra-prediction and/or inter-prediction, and subsequently transforming and coding the difference between the prediction signal and the video signal. Intra-prediction involves finding a spatial prediction mode for a chosen block size, wherein the mode predicts pixel values of the current block based on pixel samples from neighboring blocks in a specific manner, while inter-prediction involves finding inter-prediction block sizes and associated motion vectors that point to similar areas of other pictures in the video, such as other pictures in the same group of pictures (GOP).

For intra-prediction, many encoding schemes attempt to find the spatial prediction mode that best predicts the pixels of a block, where the prediction values for pixels are calculated based on the neighboring boundary blocks' pixel values. For example, HEVC (High Efficiency Video Coding) provides 35 possible intra prediction modes, including 33 angular intra prediction modes and DC and planar intra prediction modes. The intra prediction modes can be chosen at prediction blocks sizes of 4×4, 8×8, 16×16, 32×32 or 64×64. Many HEVC encoders find the best one of these 35 possible intra prediction modes by attempting all of them at every possible block size, such as trying all 35 modes on every possible size and division of PUs within a CU, before determining which of all the possibilities best predicts the pixels being encoded. For example, for each block the encoder can determine a rate-distortion cost for each possible intra prediction mode that indicates the differences between pixels predicted using that intra prediction mode and the actual pixels of the block, such that it can pick the intra prediction mode with the lowest rate-distortion cost as the one that will be used during actual encoding of the block. Such an encoder can further perform these operations for each possible block size for intra prediction.

Although attempting every possible intra prediction mode at every possible coding level for every possible intra block size for intra prediction to find the combination with the lowest rate-distortion cost can lead to good image quality, it can also be can be computationally intensive and time consuming.

Some encoding schemes have been implemented that attempt to decrease the number of calculations used to find the best intra prediction mode for a block. For example, some HEVC encoders generate a rough estimate the costs of each of the 35 possible intra prediction mode based on the sum of absolute transformed differences (SATD) between predicted and actual pixels, using Hadamard transforms. Once that is done, the encoder can identify a subset of candidates selected from the total number of possible intra prediction modes. For example, some HEVC encoders select 3 or 8 candidate intra prediction modes, based on which of the original 35 possibilities were found to have the lowest rough cost estimate. HEVC encoders also include as candidates three most probable modes (MPMs) when coding luma intra prediction modes predictively. The MPMs can be based on blocks for which intra prediction mode selection has already been performed, such as the blocks above and/or to the left of the current block. Once a subset of candidate intra prediction modes have been found, the encoder can review the candidates using more processor intensive methods, such as calculating rate-distortion cost for each candidate and then picking the one with the lowest rate-distortion cost.

However, even when the majority of intra prediction modes are removed from consideration relatively early in the process after rough cost estimates based on SATD, an encoder's selection of the best intra prediction mode for each block can still take longer than desired since it must calculate the full rate-distortion cost for each candidate.

What is needed is an encoding system that can progressively narrow down the potential candidate intra prediction modes over a series of stages for a block, and that can avoid further consideration of intra prediction modes at other block sizes. A computationally efficient algorithm is needed to determine optimal prediction modes for intra coding used in I-pictures and/or I-slices, as well as intra-coded-blocks in non-intra-slices, in the context of H.265/HEVC and other video compression schemes. Such an algorithm should preserve decoded video quality while also allowing a tunable tradeoff between computational complexity and decoded video quality.

SUMMARY

The present disclosure provides a method of encoding a digital video with a video encoder, the method comprising loading a picture comprising a plurality of pixels, arranging the plurality of pixels into a plurality of intra prediction blocks and/or inter prediction blocks, dividing the pixels of each intra prediction block into a first group, a second group, a third group, and a fourth group based on phases of the pixels, for each intra prediction block loading an initial list of intra prediction modes, at a first stage for each intra prediction block calculating a first stage cost value for each of the intra prediction modes on the initial list for the first group, calculating a first stage threshold maximum cost, and generating a first stage mode list by copying each intra prediction mode on the initial mode list that has a first stage cost value that is less than the first stage threshold maximum cost, at a second stage for each intra prediction block calculating a second stage cost value for each of the intra prediction modes on the first stage mode list for the second group, calculating a second stage threshold maximum cost, and generating a second stage mode list by copying each intra prediction mode on the first stage mode list that has a second stage cost value that is less than the second stage threshold maximum cost, at a third stage for each intra prediction block calculating a third stage cost value for each of the intra prediction modes on the second stage mode list for the third group, calculating a third stage threshold maximum cost, and generating a third stage mode list by copying each intra prediction mode on the second stage mode list that has a third stage cost value that is less than the third stage threshold maximum cost, at a fourth stage for each intra prediction block calculating a fourth stage cost value for each of the intra prediction modes on the third stage mode list for the fourth group, for each intra prediction block, selecting the intra prediction mode on the third stage mode list with the lowest fourth stage cost value as a tentative intra prediction mode for the intra prediction block, calculating a heterogeneity index for each group of contiguous intra prediction blocks in the picture, based on the tentative intra prediction mode selected for each intra prediction block after the fourth stage, and finalizing the tentative intra prediction mode for each block within each group of contiguous intra prediction blocks that has a heterogeneity index above a predetermined threshold value.

The present disclosure also provides a method of encoding a digital video with a video encoder, the method comprising loading an intra prediction block comprising a plurality of pixels, dividing the pixels of the intra prediction block into a first group, a second group, a third group, and a fourth group based on phases of the pixels, loading an initial list of intra prediction modes, at a first stage calculating a first stage cost value for each of the intra prediction modes on the initial list for the first group, calculating a first stage threshold maximum cost, and generating a first stage mode list by copying each intra prediction mode on the initial mode list that has a first stage cost value that is less than the first stage threshold maximum cost, at a second stage calculating a second stage cost value for each of the intra prediction modes on the first stage mode list for the second group, calculating a second stage threshold maximum cost, and generating a second stage mode list by copying each intra prediction mode on the first stage mode list that has a second stage cost value that is less than the second stage threshold maximum cost, at a third stage calculating a third stage cost value for each of the intra prediction modes on the second stage mode list for the third group, calculating a third stage threshold maximum cost, and generating a third stage mode list by copying each intra prediction mode on the second stage mode list that has a third stage cost value that is less than the third stage threshold maximum cost, at a fourth stage calculating a fourth stage cost value for each of the intra prediction modes on the third stage mode list for the fourth group, and selecting the intra prediction mode on the third stage mode list with the lowest fourth stage cost value as the intra prediction mode to use for the intra prediction block.

The present disclosure also provides a method of encoding a digital video with a video encoder, the method comprising loading a picture comprising a plurality of intra prediction blocks, wherein each intra prediction block is tentatively associated with a particular intra prediction mode, calculating a heterogeneity index for each group of contiguous intra prediction blocks, and finalizing the particular intra prediction mode for each intra prediction block within a group of contiguous intra prediction blocks as the intra prediction tentatively associated with the intra prediction block when the group's heterogeneity index is above a predetermined threshold value.

BRIEF DESCRIPTION OF THE DRAWINGS

Further details of the present invention are explained with the help of the attached drawings in which:

FIG. 8 depicts a generalized formula for computing a cost value for each intra prediction mode for each group of pixels selected from a block, for use in a progressive selection process.

FIG. 9 depicts a generalized formula for computing a maximum threshold cost for each stage in a progressive selection process.

FIGS. 11-18 illustrate steps of FIG. 10 using an example picture with 8×8 blocks.

FIG. 19 depicts exemplary percentage savings of a first test embodiment compared against a reference encoder.

FIG. 20 depicts exemplary percentage savings of a second test embodiment compared against a reference encoder.

FIG. 21 depicts exemplary percentage savings of a third test embodiment compared against a reference encoder.

DETAILED DESCRIPTION

Figure 1:
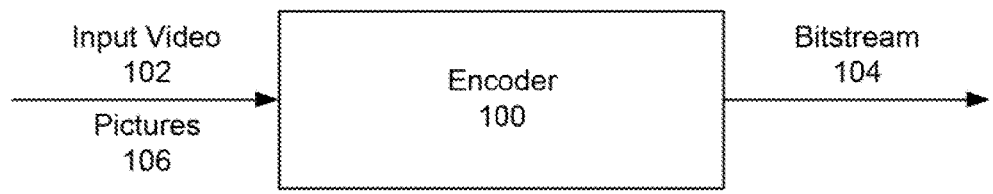
FIG. 1 depicts an embodiment of an encoder.

FIG. 1 depicts an embodiment of an encoder 100. An encoder 100 can comprise processors, memory, circuits, and/or other hardware and software elements configured to encode, transcode, and/or compress input video 102 into a bitstream 104. In some embodiments, an encoder 100 can be a dedicated hardware device. In other embodiments an encoder 100 can be, or use, software programs running on other hardware such as servers, computers, or video processing devices.

The encoder 100 can receive an input video 102 from a source, such as over a network or via local data storage from a broadcaster, content provider, or any other source. In some embodiments or situations the input video 102 can be raw and/or uncompressed video, while in other embodiments or situations the input video 102 can have been partially pre-processed or compressed by other equipment. By way of a non-limiting example, the input video 102 can be received by the encoder 100 over a network or other data connection from a broadcaster, content provider, or any other source. By way of another non-limiting example, the input video 102 can be a file loaded to the encoder 100 from a hard disk or other memory storage device connected to the encoder 100.

An input video 102 can comprise a sequence of pictures 106. The encoder 100 can be configured to encode and/or compress pictures 106 from the input video 102 into a bitstream 104, as will be discussed further below. The encoder 100 can be configured to generate the bitstream 104 according to a video coding format and/or compression scheme, such as HEVC (High Efficiency Video Coding) or H.264/MPEG-4 AVC (Advanced Video Coding). By way of a non-limiting example, in some embodiments the encoder 100 can be a Main 10 HEVC encoder. The generated bitstream 104 can be transmitted to other devices configured to decode and/or decompress the bitstream 104 for playback, such as transmission over the internet, over a digital cable television connection such as Quadrature Amplitude Modulation (QAM), or over any other digital transmission mechanism.

Figure 2:
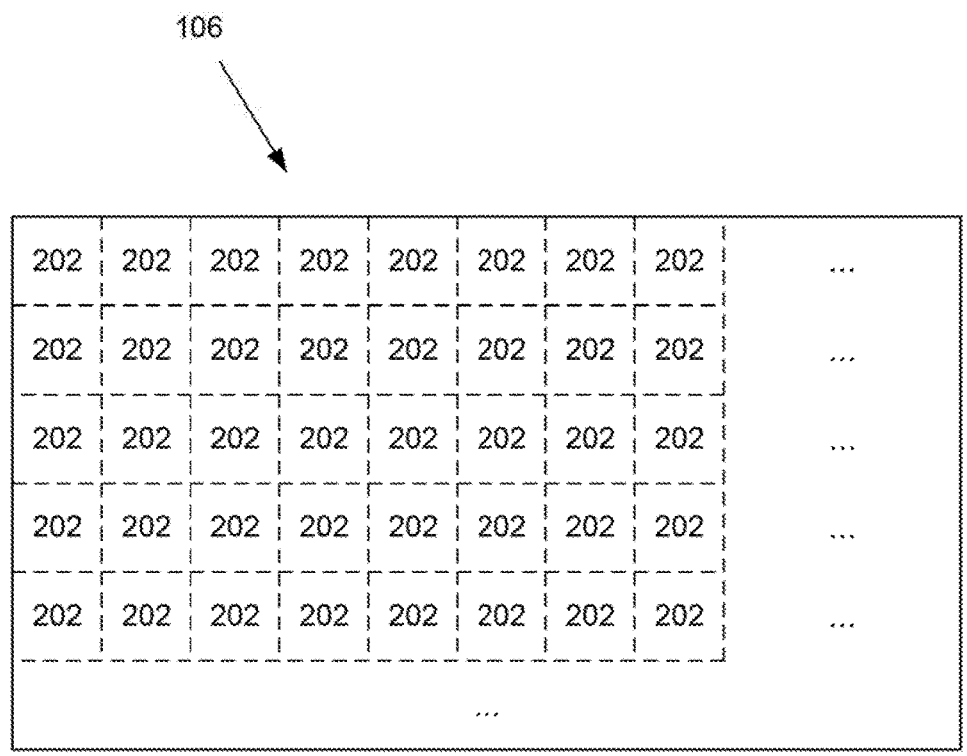
FIG. 2 depicts exemplary division of a picture into a plurality of blocks.

As shown in FIG. 2, in many coding schemes the pixels of a picture 106 can be divided into blocks 202 that can be encoded and decoded using intra-prediction or inter-prediction. In HEVC blocks 202 can be coding tree units (CTUs), coding units (CUs) and/or prediction units (PUs) within each CTU. By way of a non-limiting example, a picture 106 can be divided into CTUs of a relatively large size, such as blocks 202 of 64×64 pixels, 32×32 pixels, or 16×16 pixels. A CTU can be recursively divided into one or more CUs using a quadtree structure. Each CU can be divided into one or more PUs that can be encoded and decoded using intra-prediction or inter-prediction. In other coding schemes, blocks 202 can be macroblocks or any other region or area of a picture 106.

Coding with inter-prediction comprises finding an inter-prediction block size and using temporal prediction to find a motion vector that points to similar sections of a reference picture, such as a preceding or subsequent picture 106 in the same group of pictures (GOP). Motion vectors that point to the best match predictions in specified reference pictures can be encoded within the bitstream 104 for inter-predicted blocks 202. As such, temporal redundancy in the input video 102 can be reduced by pointing to similar areas in other pictures 106.

Coding with intra-prediction comprises finding a spatial prediction mode for a chosen block size that predicts pixel values of the block 202 based on pixel samples of neighboring blocks 202 in the same picture 106. According to the particular coding scheme being used, the encoder 100 can search through pixels in neighboring blocks 202 in the picture 106 in specific spatial directions described by a plurality of different intra prediction modes, to find the best match for a current block 202. As such, spatial redundancy in the input video 102 can be reduced by pointing to similar areas in the same picture 106. As will be described below, an encoder 100 can determine the best intra prediction mode and/or block 202 size, and encode the selected intra prediction mode in the bitstream 104 for intra-predicted blocks 202.

Figure 3:
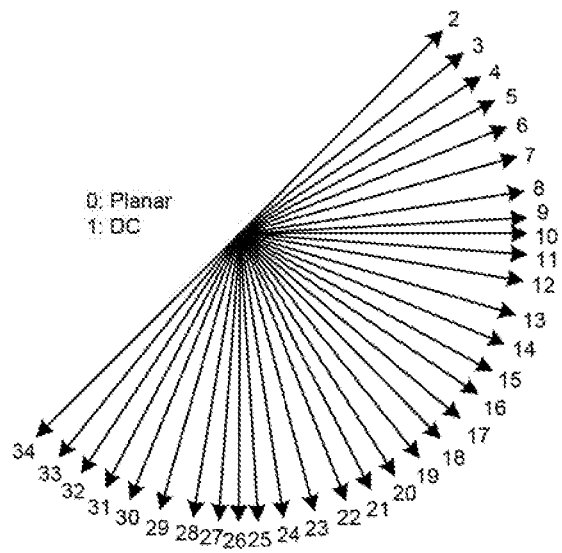
FIG. 3 depicts intra prediction modes used in HEVC.
Figure 4:
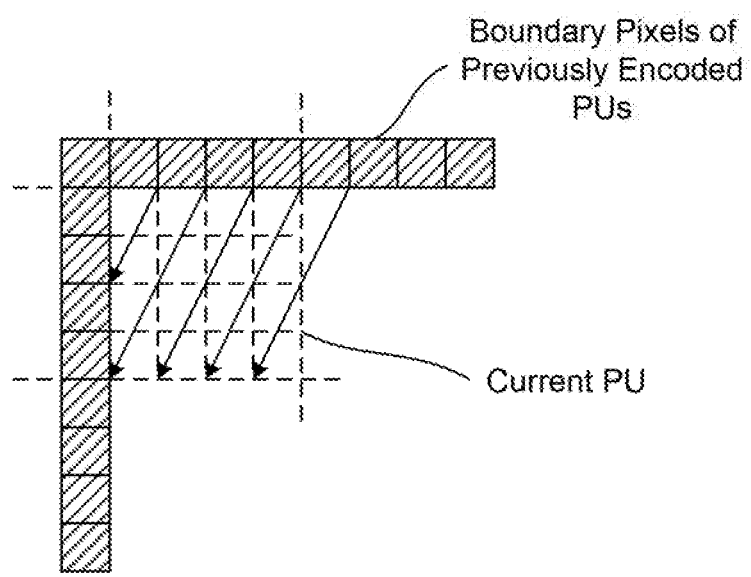
FIG. 4 depicts an example of a PU being predicted with an angular intra prediction mode in HEVC.

By way of a non-limiting example, FIG. 3 depicts possible intra prediction modes used in HEVC, including a planar mode, a DC mode, and 33 angular modes. FIG. 4 depicts an example of a PU being predicted with an angular intra prediction mode. In HEVC a PU can be predicted from already encoded PUs in a picture 106 using one of the angular intra prediction modes. The angle of the particular intra prediction mode used to predict a PU can indicate the displacement between the lowest row of the PU and a previously coded reference row above the PU, or the displacement between the rightmost column of the PU and a previously coded reference column to the left of the PU. The pixels of a PU can be predicted from previously coded PUs by linearly extrapolating sample pixels within the reference row or column according to the angular intra prediction mode. In some embodiments, the pixels of a PU can be predicted from reference pixels in previously coded PUs at $\frac{1}{32}$th pixel accuracy.

A picture 106 with blocks 202 encoded entirely with intra-prediction can be referred to as an "I-frame." I-frames can be encoded or decoded independently from other pictures 106, as each of its blocks 202 can be coded with reference to other sections of the same picture 106. Pictures 106 with at least some blocks 202 encoded with inter-prediction can be referred to as "P-frames" when the inter-predicted blocks 202 refer back to earlier blocks 202, or as "B-frames" when the inter-predicted blocks 202 refer to both earlier and subsequent blocks 202. In some embodiments or situations, a GOP can begin with an I-frame and be followed by a sequence of P-frames and/or B-frames encoded with reference to other pictures 106 in the GOP.

Figure 5:
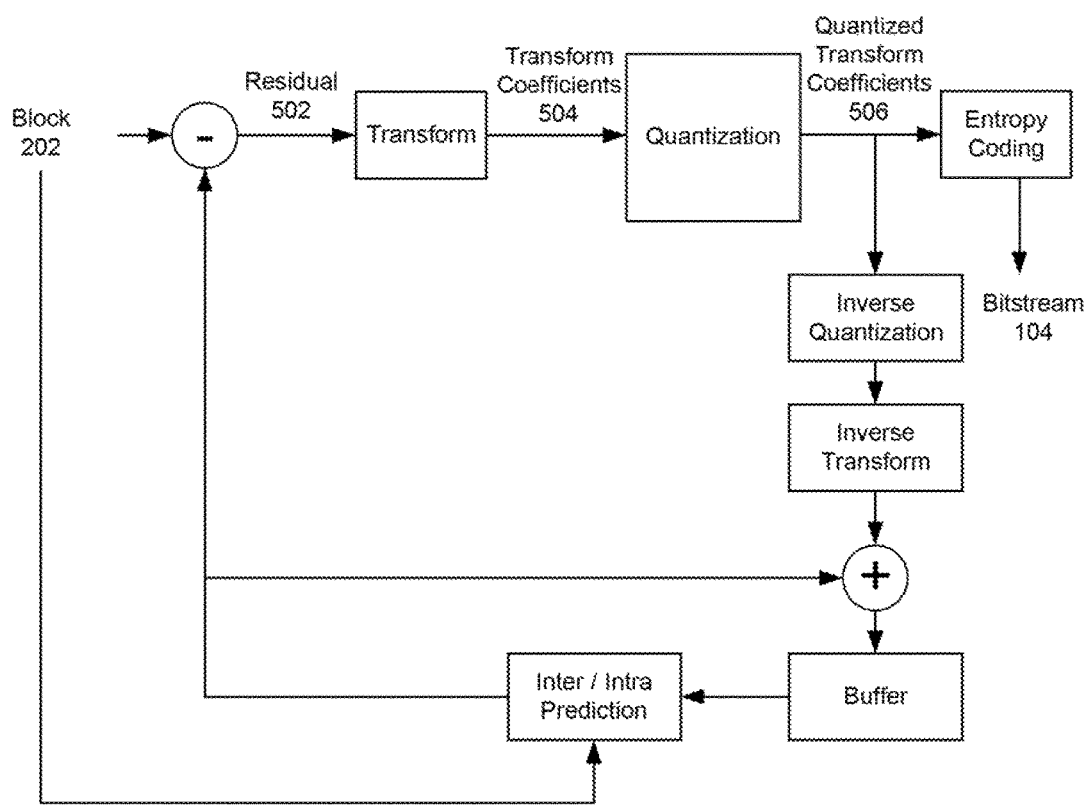
FIG. 5 depicts a flow chart for a method of encoding blocks to generate a bitstream.

FIG. 5 depicts a flow chart for a method of encoding blocks 202 to generate a bitstream 104. As described above, a block 202 can be inter-predicted or intra-predicted based on areas within the same picture 106 or other reference pictures 106. Any differences between a block 202 and areas referenced through an intra prediction mode or motion vector in the same or other pictures 106 can be referred to as the block's residual 502. In addition to encoding the intra prediction mode or motion vector in the bitstream 104, the residual 502 can also be encoded into the bitstream as shown in FIG. 5. In HEVC, the residual 502 of a PU can be encoded through one or more transform units (TUs).

The encoder 100 can perform a transform on the residual 502 to produce transform coefficients 504. By way of a non-limiting example, a residual 502 can be transformed with a Discrete Cosine Transform (DCT)-like operation to produce DC and AC transform coefficients 504. In HEVC, 4×4 luma transform blocks that belong to an intra coded region can be transformed using an integer transform that is derived from discrete sine transform (DST). Each resulting transform coefficient 504 can then be quantized into one of a finite number of possible values to convert it into a quantized transform coefficient 506, using a quantization parameter that indicates the step size between each possible value for the quantized transform coefficients 506. The quantized transform coefficients 506 can be encoded into the bitstream 104. In some embodiments, the quantized transform coefficients 506 can be encoded into the bitstream 104 using entropy coding. By way of a non-limiting example, in HEVC the quantized transform coefficients 506 can be entropy encoded using CABAC (context-adaptive binary arithmetic coding).

As shown in FIG. 5, quantized transform coefficients 506 can also be inverse quantized and inverse transformed, and the result can be used to create reconstructed pictures 106 and/or blocks 202 that can be held as reference pictures or blocks in a buffer within the encoder 100. The encoder 100 can use the reconstructed reference pictures during inter prediction of subsequent blocks 202, and reconstructed blocks that have already undergone intra prediction within the same picture during intra prediction of subsequent blocks 202. By way of a non-limiting example, an encoder 100 can encode a block 202 in a P-frame with reference to another picture 106 or block 202 that has already been encoded, and the encoder 100 can access and/or reference that preceding picture 106 or block 202 in the buffer when coding the new block 202.

Figure 6:
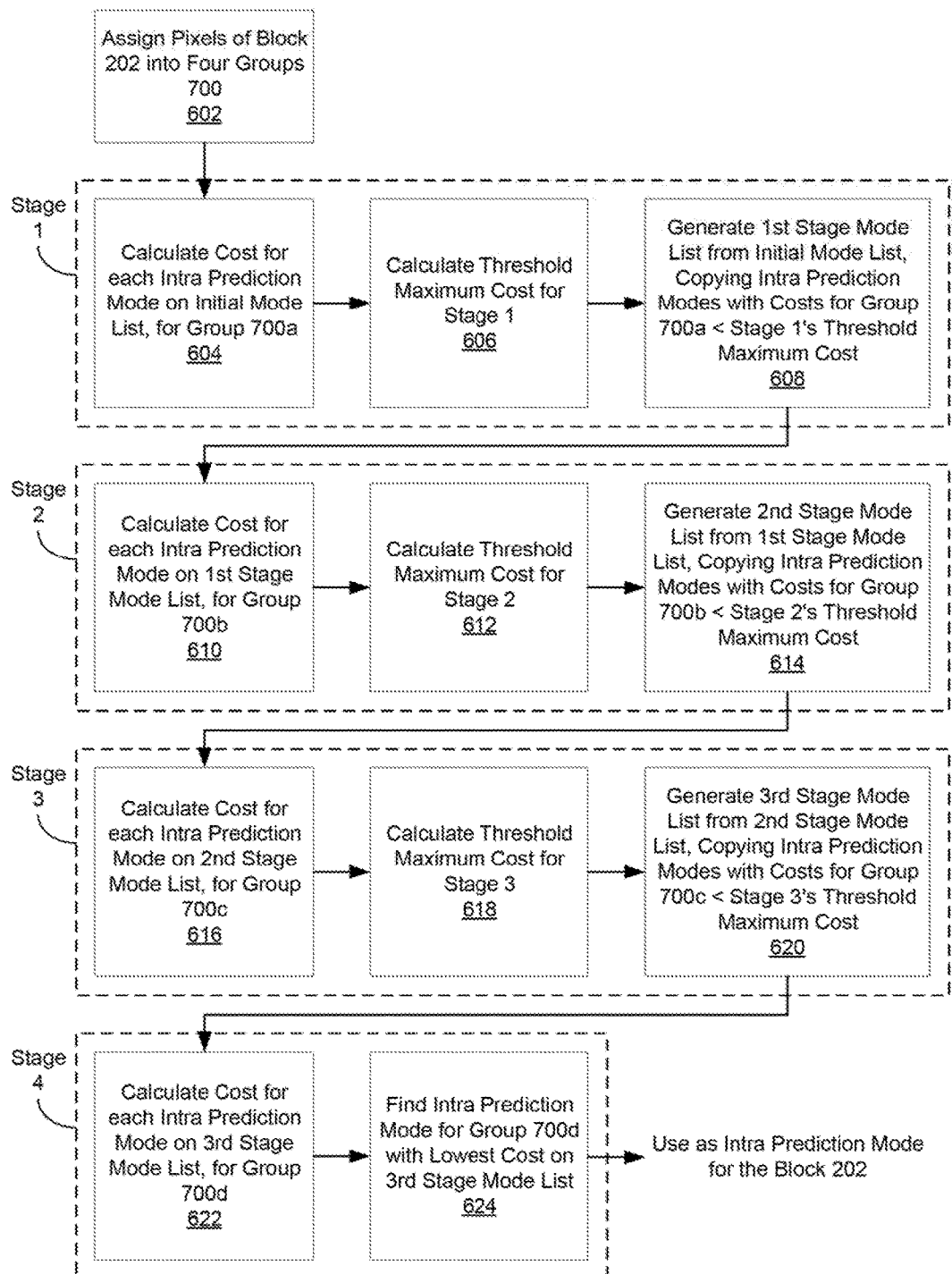
FIG. 6 depicts a progressive selection process for determining the best intra prediction mode to use to encode a particular block.

FIG. 6 depicts a progressive selection process for determining the best intra prediction mode to use to encode a particular block 202, such as an individual PU in HEVC encoding. As described above there can be many possible intra prediction modes that can be used to encode a block 202 with intra prediction, such as the 35 possible intra prediction modes used in HEVC. As such, an encoder 100 can use the process of FIG. 6 to progressively narrow down over a series of four stages from an initial list of many intra prediction modes to a single intra prediction mode to use for a block 202. At each stage, candidate intra prediction modes that are unlikely to be selected as the best intra prediction mode for the block 202 can be removed from consideration.

Figure 7:
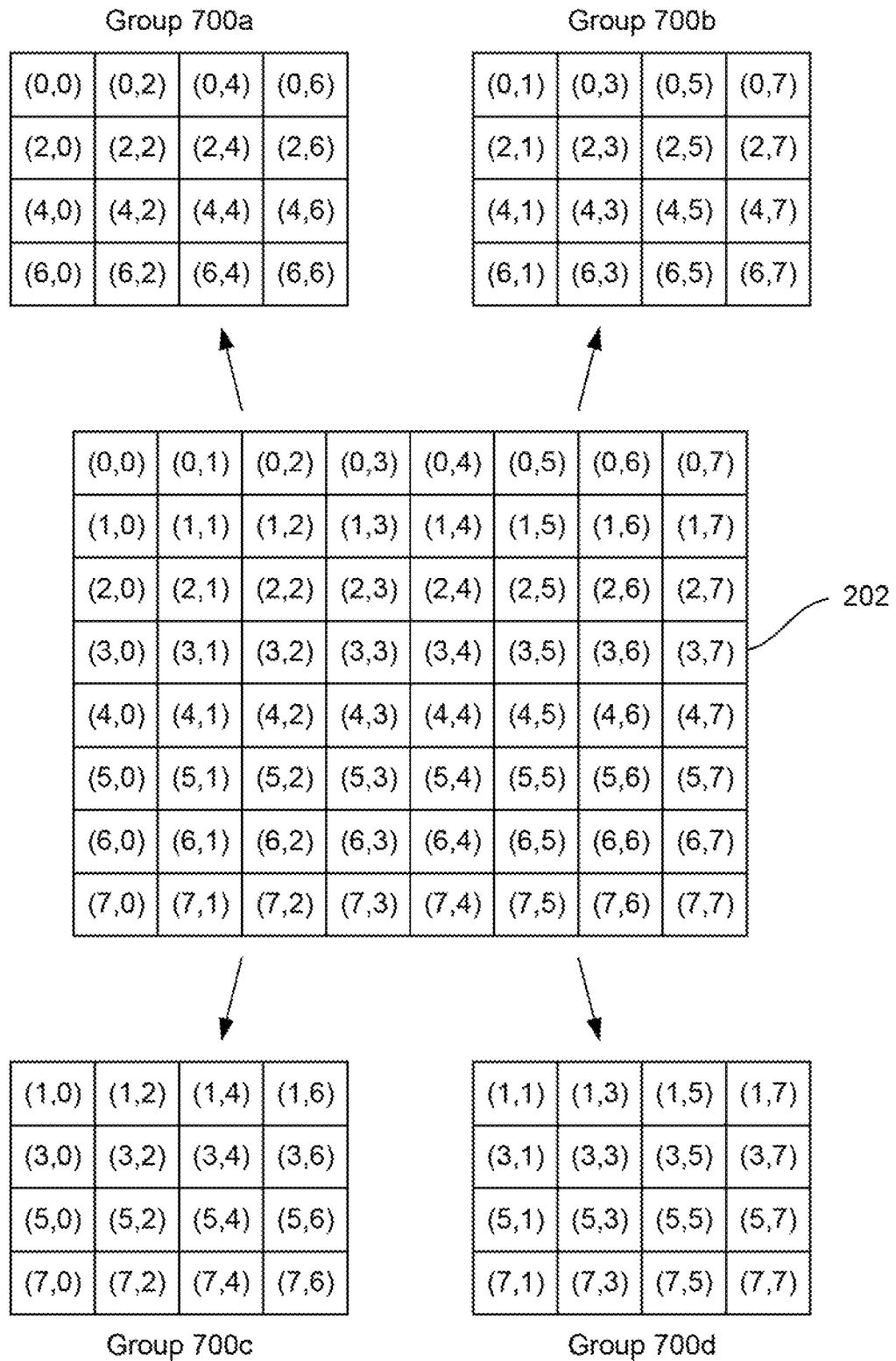
FIG. 7 depicts the division of a block's pixels into four groups, for use in a progressive selection process.

At step 602, the encoder 100 can assign the pixels of a block 202 that is to be coded into four groups 700 based on phases, as shown in the example of FIG. 7. Each group 700 can contain pixels of the same phase from the block 202 without overlap, such that no group 700 shares any pixels and all pixels from the block 202 are part of a group 700. In some embodiments, each of the four pixels within each smaller 2×2 sub-block in the block 202 can be assigned to a different group. By way of a non-limiting example, FIG. 7 depicts an 8×8 pixel block 202. As shown in FIG. 7, the 64 pixels of the block 202 can be divided into four groups 700, with the top left pixel of each 2×2 sub-block being a first phase pixel that can be assigned to group 700a, the top right pixel of each 2×2 sub-block being a second phase pixel that can be assigned to group 700b, the bottom left pixel of each 2×2 sub-block being a third phase pixel that can be assigned to group 700c, and the bottom right pixel of each 2×2 sub-block being a fourth phase pixel that can be assigned to group 700d. Assigning pixels into groups 700 based on phases can be appropriate for intra prediction, as a picture 106 being encoded with intra prediction can be considered to be generated from a stationary source.

At step 604 the encoder 100 can begin the first stage of the progressive selection process, using the pixels of the first group 700a and an initial list of intra prediction modes. In some embodiments, the initial list of intra prediction modes can include all of the possible intra prediction modes for the encoding scheme, such as all of the 35 possible intra prediction modes for HEVC. In other embodiments, the initial list of intra prediction modes can include a subset of all possible intra prediction modes for the encoding scheme, such as if other preprocessing has generated a list of eight candidates for the best intra prediction modes.

During step 604 the encoder 100 can determine a cost value associated with encoding the pixels of the first group 700a for each intra prediction mode listed on the initial list of intra prediction modes. For each intra prediction mode considered during the first stage, the encoder 100 can find a cost value ($Cost_{Group1}$), where $Cost_{Group1} = SATD_1 + P*(\lambda(Q_p))*R$.

In this formula, the first term, $SATD_1$, can be the sum of the absolute transformed differences between the original pixels of the first group 700a and the predicted pixels using the intra prediction mode under consideration. $SATD_1$ can be calculated using a frequency transform between the original and predicted pixels, such as a Hadamard transform. In alternate embodiments, a sum of absolute differences (SAD), sum of squared differences (SSD), or any other metric for measuring differences between pixels can be used in place of the SATD term.

Additionally, in this formula the second term, $P*(\lambda(Q_p))*R$, can be the product of the bitrate (R) being used by the encoder 100 to encode the block 202 and a Lagrange multiplier $\lambda(Q_p)$. The Lagrange multiplier can be a function of the quantization parameter ($Q_p$) being used by the encoder 100 to encode the block 202. P can be a parameter that can be set to 0 if the intra prediction mode under consideration has been identified as a most probable mode based on intra prediction modes already selected for previously coded neighboring blocks 202. By way of a non-limiting example, HEVC encoders 100 can identify most probable modes for a PU based on intra prediction modes used for previously coded PUs above and/or to the left of the PU. As such, when the intra prediction mode under consideration if found to be a most probable mode, P can be set to 0 such that the second term falls out of the formula and $Cost_{Group1}$ can be determined by $SATD_1$ alone. However, if the intra prediction mode under consideration has not been identified as a most probable mode, the value of P can be set to 1 and the second term can be taken into account when determining the cost value $Cost_{Group1}$.

At step 606, the encoder 100 can calculate a threshold maximum cost ($T_1$) for the first stage. The encoder 100 can calculate the first stage's threshold maximum cost using the formula $T_1 = Cost_{Group1}(min) + S_1 * Range_1$.

In the formula for calculating $T_1$, $Cost_{Group1}(min)$ can be the lowest cost value $Cost_{Group1}$ found during step 604. $S_1$ can be a selection factor associated with the first stage that is similar to selection factors $S_2$ and $S_3$ that will be discussed below for the second and third stages. The values of the selection factors $S_i$ can be set to be between zero and one, based on a desired signal-to-noise relationship between a reconstructed video image and the original video image. By way of a non-limiting example, in some embodiments the values of $S_i$ can be chosen such that $0 < S_3 < S_2 < S_1 < 1$. The selection of a value for $S_i$ can be based on the cost vs. peak signal-to-noise ratio (PSNR) criteria for fixed quantization parameters, and the values can be different for different quantization parameters. $Range_1$ can be the range of cost values found for the first group 700a, and can be calculated by subtracting the lowest cost value $Cost_{Group1}$ found during step 604 from the highest cost value $Cost_{Group1}$ found during step 604.

At step 608, the encoder 100 can generate a first stage mode list that includes intra prediction modes from the initial list that were found to have cost value $Cost_{Group1}$ that are less than $T_1$, the threshold maximum cost for the first stage. As such, any intra prediction modes from the initial list that were found to have cost values $Cost_{Group1}$ that exceed the first stage's threshold maximum cost $T_1$ can be eliminated from consideration. After preparing the first stage mode list that includes intra prediction modes with cost values $Cost_{Group1}$ that are less than the first stage's threshold maximum cost $T_1$, the encoder can move to the second stage at step 610.

At step 610 the encoder 100 can begin the second stage of the progressive selection process, using the pixels of the second group 700b and the first stage mode list. As described above, the first stage mode list can include intra prediction modes found during the first stage to have cost values relative to the first group 700a that were less than the first stage's threshold maximum cost $T_1$.

During step 610 the encoder 100 can determine a cost value associated with encoding the pixels of the second group 700b for each intra prediction mode remaining on the first stage mode list. For each intra prediction mode considered during the second stage, the encoder 100 can find a cost value $Cost_{Group2}$, where $Cost_{Group2} = SATD_2 + P*(\lambda(Q_p))*R + Cost_{Group1}$.

For the second stage, the first term of the formula, $SATD_2$, can be the sum of the absolute transformed differences between the original pixels of the second group 700b and the predicted pixels using the intra prediction mode under consideration. In alternate embodiments, SAD, SSD, or any other difference metric can be used in place of the SATD term. The second term can depend on the bitrate (R), the Lagrange multiplier $\lambda(Q_p)$, and the value of P, which can all be set as described above with respect to the first stage. Additionally, for the second stage, the formula can have a third term that adds the cost value for the first group 700a, $Cost_{Group1}$, that was found during step 604 for the intra prediction mode under consideration.

At step 612, the encoder 100 can calculate a threshold maximum cost ($T_2$) for the second stage. The encoder 100 can calculate the second stage's threshold maximum cost using the formula $T_2 = Cost_{Group2}(min) \pm S_2 * 2 * Range_1$.

In the formula for calculating $T_2$, $Cost_{Group2}$ (min) can be the lowest cost value $Cost_{Group2}$ found during step 610. As described above, the value of parameter $S_2$ can be selected such that $0 < S_3 < S_2 < S_1 < 1$. $Range_1$ can be the same value used during step 606 for the range of cost values found for the first group 700a, however its value can be multiplied by two for the second stage as shown in the formula.

At step 614, the encoder 100 can generate a second stage mode list that includes intra prediction modes from the first stage mode list that were found to have cost value $Cost_{Group2}$ that are less than $T_2$, the threshold maximum cost for the second stage. As such, any intra prediction modes that survived the first stage but were found to have cost values $Cost_{Group2}$ that exceed the second stage's threshold maximum cost $T_2$ can be eliminated from consideration. After preparing the second stage mode list that includes intra prediction modes with cost values $Cost_{Group2}$ that are less than the second stage's threshold maximum cost $T_2$, the encoder can move to the third stage at step 616.

At step 616 the encoder 100 can begin the third stage of the progressive selection process, using the pixels of the third group 700c and the second stage mode list. As described above, the second stage mode list can include intra prediction modes found during the second stage to have cost values relative to the second group 700b that were less than the second stage's threshold maximum cost $T_2$.

During step 616 the encoder 100 can determine a cost value associated with encoding the pixels of the third group 700c for each intra prediction mode remaining on the second stage mode list. For each intra prediction mode considered during the third stage, the encoder 100 can find a cost value $Cost_{Group3}$, where $Cost_{Group3} = SATD_3 + P*(\lambda(Q_p))*R + Cost_{Group2}$.

For the third stage, the first term of the formula, $SATD_3$, can be the sum of the absolute transformed differences between predicted pixels using the intra prediction mode under consideration and the original pixels of the third group 700c. In alternate embodiments, SAD, SSD, or any other difference metric can be used in place of the SATD term. The second term can depend on the bitrate (R), the Lagrange multiplier $\lambda(Q_p)$, and the value of P, which can all be set as described above with respect to previous stages. The formula's third term can be the cost value for the second group 700b, $Cost_{Group2}$, that was found during step 610 for the intra prediction mode and block size under consideration.

At step 618, the encoder 100 can calculate a threshold maximum cost ($T_3$) for the third stage. The encoder 100 can calculate the third stage's threshold maximum cost using the formula $T_3 = Cost_{Group3}(min) + S_3 * 3 * Range_1$.

In the formula for calculating $T_3$, $Cost_{Group3}$(min) can be the lowest cost value $Cost_{Group3}$ found during step 616. As described above, the value of parameter $S_3$ can be selected such that $0 < S_3 < S_2 < S_1 < 1$. $Range_1$ can be the same value used during step 606 for the range of cost values found for the first group 700a, however its value can be multiplied by three for the third stage as shown in the formula.

At step 620, the encoder 100 can generate a third stage mode list that includes intra prediction modes from the second stage mode list that were found to have cost value $Cost_{Group3}$ that are less than $T_3$, the threshold maximum cost for the third stage. As such, any intra prediction modes that survived the second stage but were found to have cost values $Cost_{Group3}$ that exceed the third stage's threshold maximum cost $T_3$ can be eliminated from consideration. After preparing the third stage mode list that includes intra prediction modes with cost values $Cost_{Group3}$ that are less than the third stage's threshold maximum cost $T_3$, the encoder can move to the fourth stage at step 622.

At step 622 the encoder 100 can begin the fourth stage of the progressive selection process, using the pixels of the fourth group 700d and the third stage mode list. As described above, the third stage mode list can include intra prediction modes found during the third stage to have cost values relative to the third group 700c that were less than the third stage's threshold maximum cost $T_3$.

During step 622 the encoder 100 can determine a cost value associated with encoding the pixels of the fourth group 700d for each intra prediction mode remaining on the third stage mode list. For each intra prediction mode considered during the fourth stage, the encoder 100 can find a cost value $Cost_{Group4}$, where $Cost_{Group4} = SATD_4 + P*(\lambda(Q_p))*R + Cost_{Group3}$.

For the fourth stage, the first term of the formula, $SATD_4$, can be the sum of the absolute transformed differences between the original pixels of the fourth group 700d and the predicted pixels using the intra prediction mode under consideration. In alternate embodiments, SAD, SSD, or any other difference metric can be used in place of the SATD term. The second term can depend on the bitrate (R), the Lagrange multiplier $\lambda(Q_p)$, and the value of P, which can all be set as described above with respect to previous stages. The formula's third term can be the cost value for the third group 700c, $Cost_{Group3}$, that was found during step 616 for the intra prediction mode and block size under consideration.

At step 624, the encoder 100 can determine a best intra prediction mode by selecting the intra prediction mode remaining on the third stage mode list that has the lowest cost value $Cost_{Group4}$. That best intra prediction mode can then be used to encode the block 202.

Although FIG. 6 depicts an embodiment with a four-stage progressive mode selection process, in alternate embodiments the process can have a different number stages with the pixels of the block 202 being grouped into a corresponding number of groups 700. As such, FIG. 8 depicts a generalized formula for computing the cost value for each intra prediction mode for each group, and FIG. 9 depicts a generalized formula for computing a maximum threshold cost for each stage. As can be seen from the description above, the exemplary process of FIG. 6 follows the formulas of FIGS. 8-9 for a four-stage progressive mode selection process.

In some embodiments, the encoder 100 can additionally consider each possible size for the blocks 202 along with each possible intra prediction mode, and progressively narrow down possible combinations of block 202 sizes and intra prediction modes over the stages of the progressive selection process. By way of a non-limiting example, for a CU an encoder 100 can begin the first stage with a list of 35

HEVC intra prediction modes and generate a cost value for each of them for each possible arrangement of PUs with the CU. The cost value of each size and mode combination can be compared against a threshold maximum cost, such that the combinations can be progressively narrowed over the stages until one with the lowest cost is found during the last stage. The encoder 100 can then use that combination of block 202 size and intra prediction mode to encode the block 202.

After the encoder 100 has selected an intra prediction mode for each block 202 in a picture 106, through the process of FIG. 6 or through any other mode selection process, the encoder 100 can review different regions of the picture 106 to determine whether the blocks 202 within the regions should be encoded together or separately. The encoder 100 can review the selected intra prediction modes for each block 202 in a region, and if they are heterogeneous enough based on a threshold value, each block 202 can be encoded separately using the intra prediction mode selected for each block 202. However, if their intra prediction modes are not found to be heterogeneous enough based on the threshold value, the encoder 100 can explore encoding the blocks 202 together using a shared intra prediction mode, potentially along with blocks 202 of other regions with sufficiently homogenous intra prediction modes.

Figure 10A:
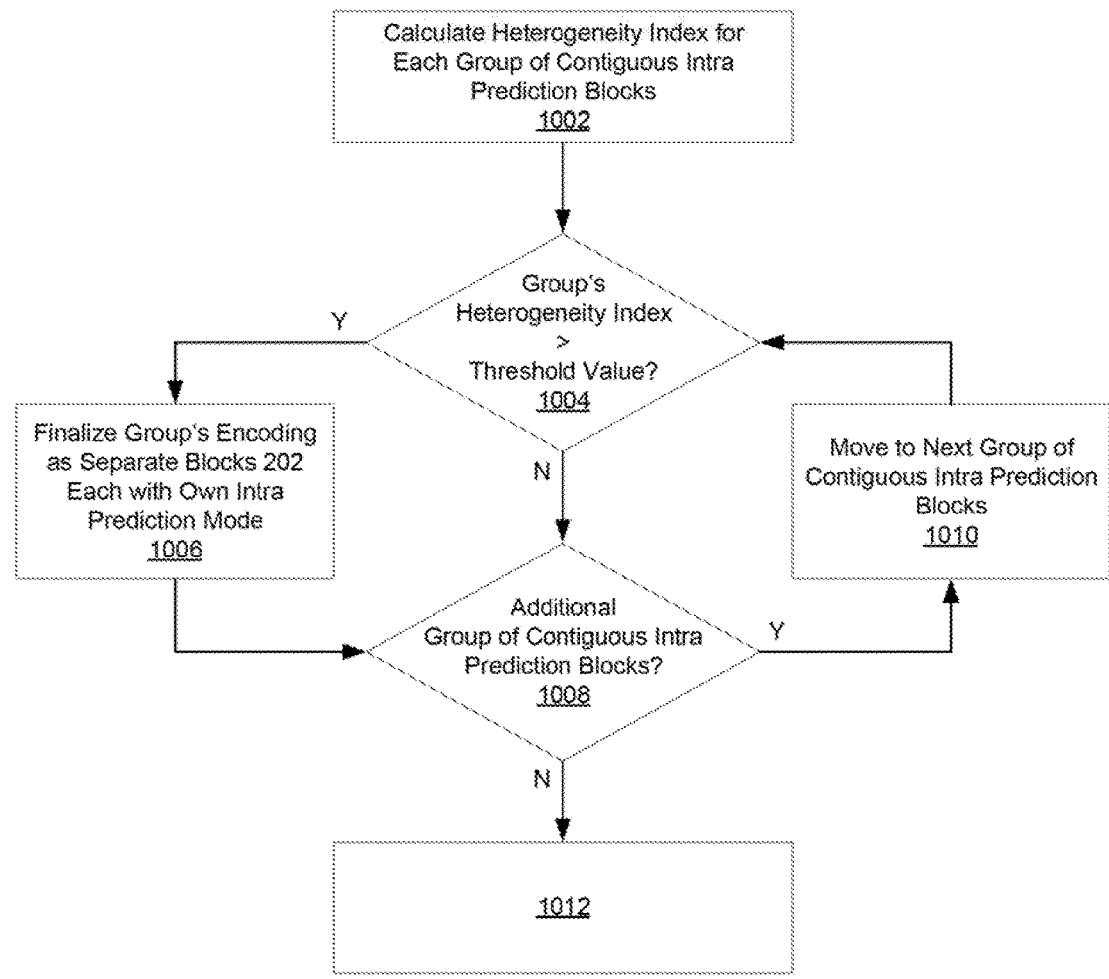
FIGS. 10A-10B depicts a process for determining region sizes for encoding groups of one or more blocks using a shared intra prediction mode.
Figure 10B:
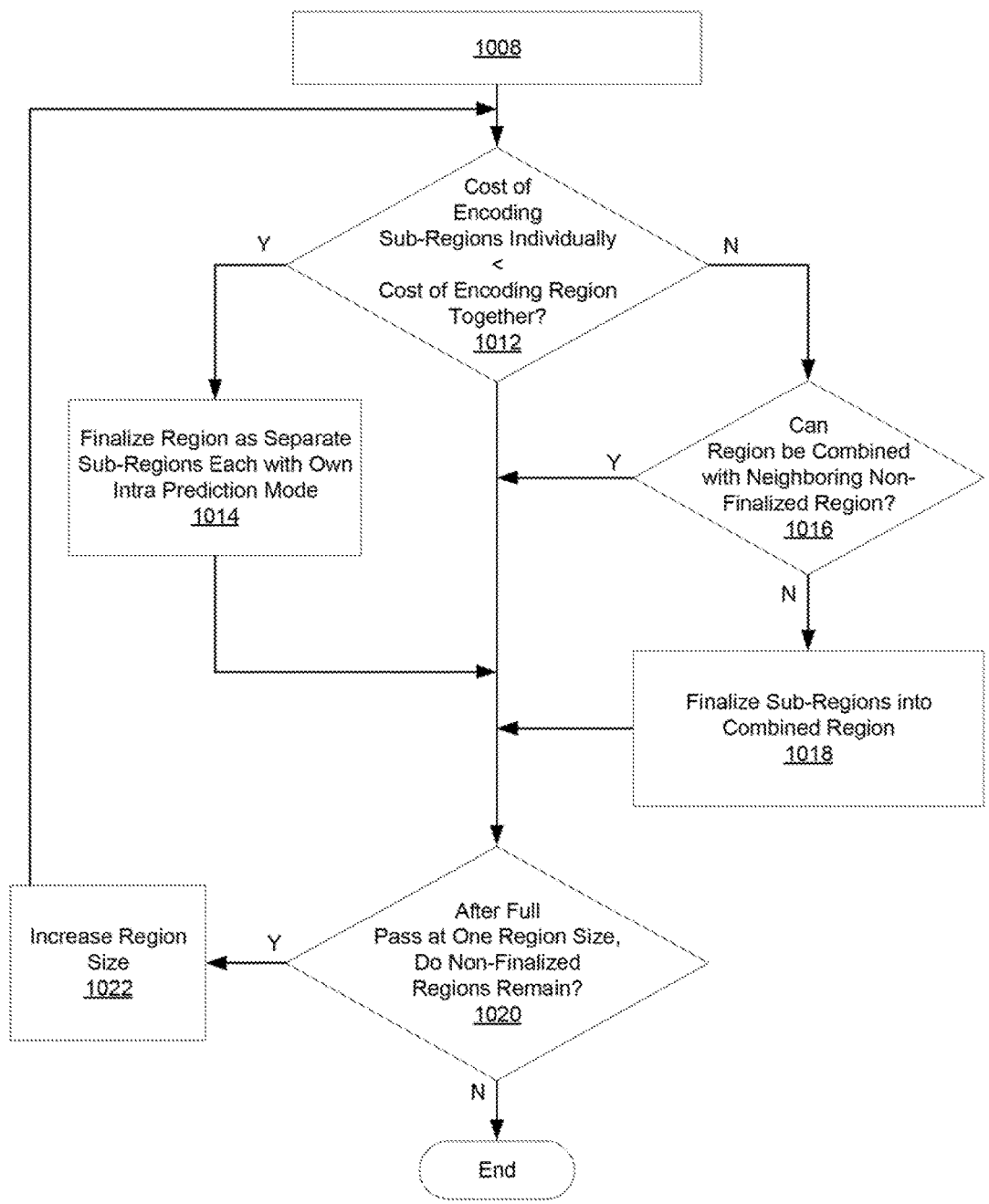
Figure 13:
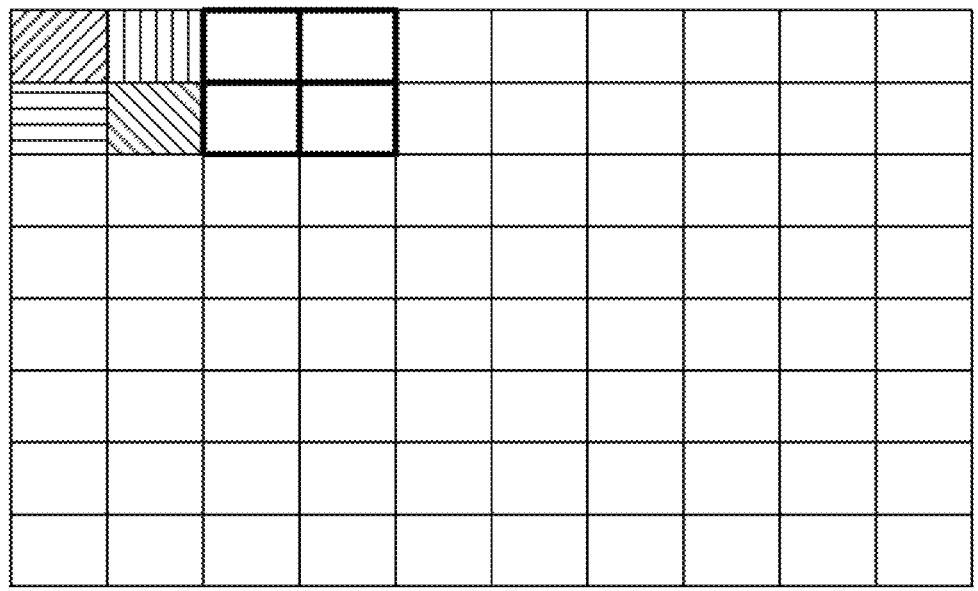

FIGS. 10A-10B depict a process for determining region sizes for encoding groups of contiguous intra prediction blocks 202 in a picture 106 using a shared intra prediction mode. The encoder 100 can have previously found an intra prediction mode for each of the intra prediction blocks 202 through the process of FIG. 6 or through any other mode selection process. FIGS. 11-18 depict steps of FIG. 10 using a non-limiting exemplary picture 106 in which each block 202 shown in FIG. 11 initially has a size of 8×8 pixels.

Figures 11, 12:
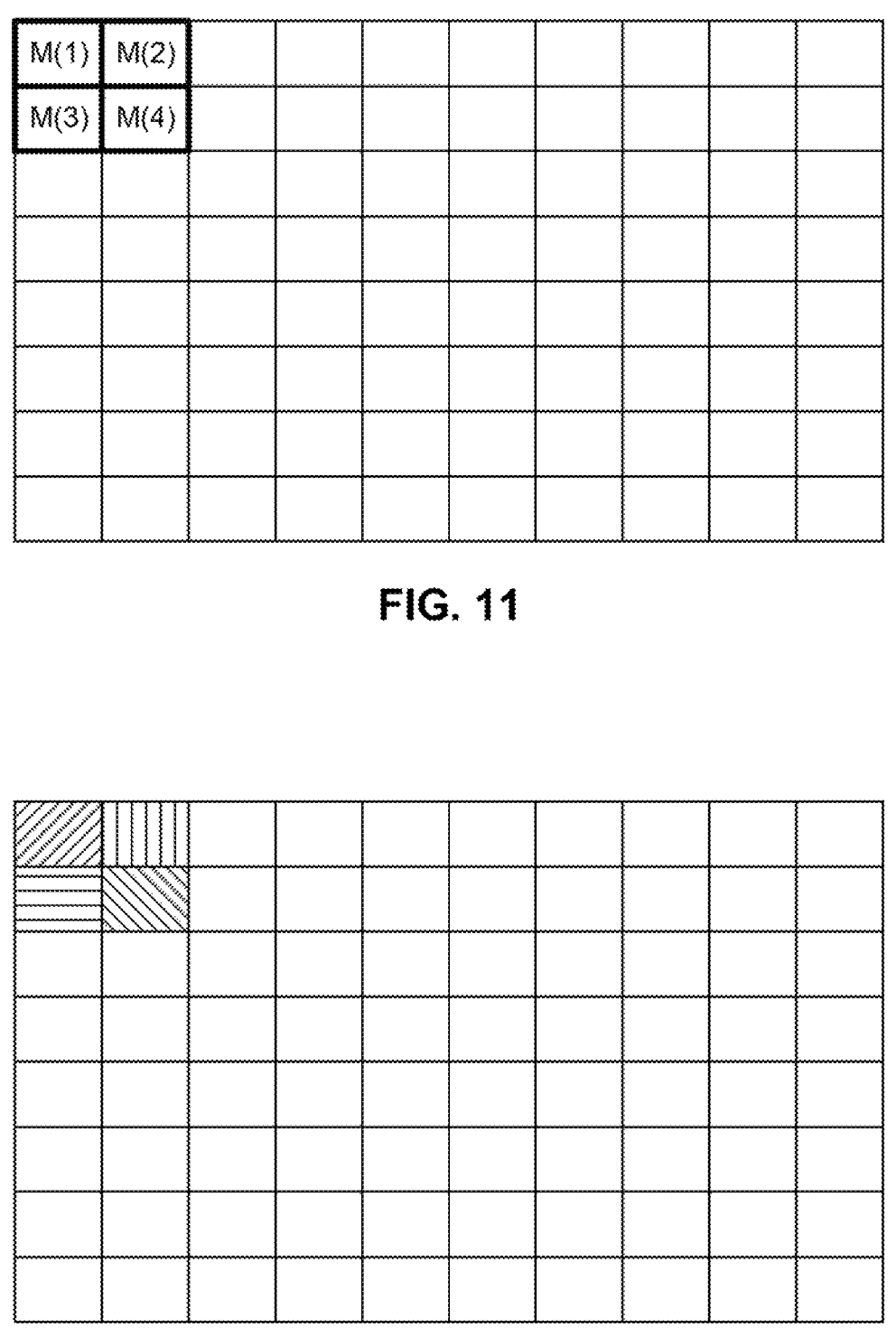

At step 1002, the encoder 100 can determine a heterogeneity index for each non-overlapping group of contiguous intra prediction blocks 202 of a particular size within the picture 106. By way of a non-limiting example, the encoder 100 can consider each group of four contiguous intra prediction blocks 202 arranged two blocks high and two blocks wide. In the example of FIG. 11, within each 16×16 region the encoder 100 can consider each group of four intra prediction blocks 202 arranged two by two, as each block 202 has 8×8 pixels. The heterogeneity index for a four block group can be the sum of the differences between the intra prediction modes selected for each individual block 202 in the group. By way of a non-limiting example, the encoder 100 can review the upper left corner group of four blocks 202 as shown in FIG. 11, such that the intra prediction mode of the top left block 202 is M(1), the intra prediction mode of the top right block 202 is M(2), the intra prediction mode of the bottom left block 202 is M(3), and the intra prediction mode of the bottom right block 202 is M(4).

The group's heterogeneity index can be the sum of the vertical differences between the intra prediction modes of the blocks 202 in the group's left and right columns, and the horizontal differences between the intra prediction modes of the blocks 202 in the group's top and bottom rows. By way of a non-limiting example, the encoder 100 can find the heterogeneity index of the upper left four block group shown in FIG. 11 by calculating the horizontal difference between M(1) and M(2) as $\partial 1$, the vertical difference between M(1) and M(3) as $\partial 2$, the horizontal difference between M(3) and M(4) as $\partial 3$, and the vertical difference between M(2) and M(4) as $\partial 4$. The encoder 100 can thus determine the group's heterogeneity index from the sum of these differences: $\partial 1 + \partial 2 + \partial 3 + \partial 4$.

When two blocks 202 in the group both have angular intra prediction modes, the difference between them can be the actual horizontal and/or vertical differences between the intra prediction modes. When one block 202 has an angular intra prediction mode and another has a DC or planar intra prediction mode, the difference between them can be parameterized to a preselected value. By way of a non-limiting example, the encoder 100 can be set to use a value of 3 for a difference between an angular intra prediction mode and a DC or planar intra prediction mode.

At step 1004, the encoder 100 can compare a group's heterogeneity index against a predefined threshold value. If the group's heterogeneity index is above the predefined threshold value, the group can be considered heterogeneous and the encoder 100 can finalize the group as individual blocks 202 at step 1006. By way of a non-limiting example, if the threshold value is set at 14, a four block group with a heterogeneity index above 14 can be considered heterogeneous and each of the four blocks can be finalized at its original size. When a group of blocks 202 is finalized as individual blocks 202 at step 1006, the encoder 100 can later encode each of the individual blocks 202 using the specific intra prediction mode selected earlier for that block 202. As such, for blocks 202 within a finalized group, the encoder 100 can skip further steps presented below regarding analyzing the group's blocks at larger region sizes, thereby reducing processing time, processor load, and other resource uses.

By way of a non-limiting example, if the encoder 100 finds that the upper-left group of four 8×8 blocks 202 shown in FIG. 11 has a heterogeneity index that is above a predefined threshold value, the encoder 100 at step 1006 can finalize that 16×16 region of the picture 106 as four individual 8×8 block 202. As such, each of the four blocks 202 can be encoded using their own intra prediction mode. FIG. 12 depicts the four blocks 202 of this group filled in to indicate that the encoder 100 has confirmed via the group's heterogeneity index that the blocks 202 are to be separately encoded at their original 8×8 size.

However, if instead at step 1004 the encoder 100 finds that a group's heterogeneity index is not above the predefined threshold value, it can defer finalization of that group's region until after its blocks 202 have been reviewed at one or more larger region sizes as will be described below. By way of a non-limiting example, the encoder 100 can find that the four block group outlined in FIG. 13 has a heterogeneity index that is not above the predefined threshold value, and as such the encoder 100 can defer finalization of that region.

After reviewing a group of contiguous intra prediction blocks 202 at step 1004, the encoder 100 can move directly to step 1008 if the group's heterogeneity index is not above the predefined threshold value, or it can move to step 1008 after finalizing the region as four separate blocks 202 at step 1006. At step 1008, the encoder 100 can determine if there are remaining groups of contiguous intra prediction blocks 202 in the picture 106 that it has not yet reviewed at step 1004. If there are, the encoder 100 can move to the next group at step 1010 and then compare that group's heterogeneity index against the predefined threshold value at step 1004. However, if the heterogeneity index of all groups of contiguous intra prediction blocks 202 in the picture 106 have been compared against the predefined threshold value, the encoder can move to step 1012.

Figure 14:
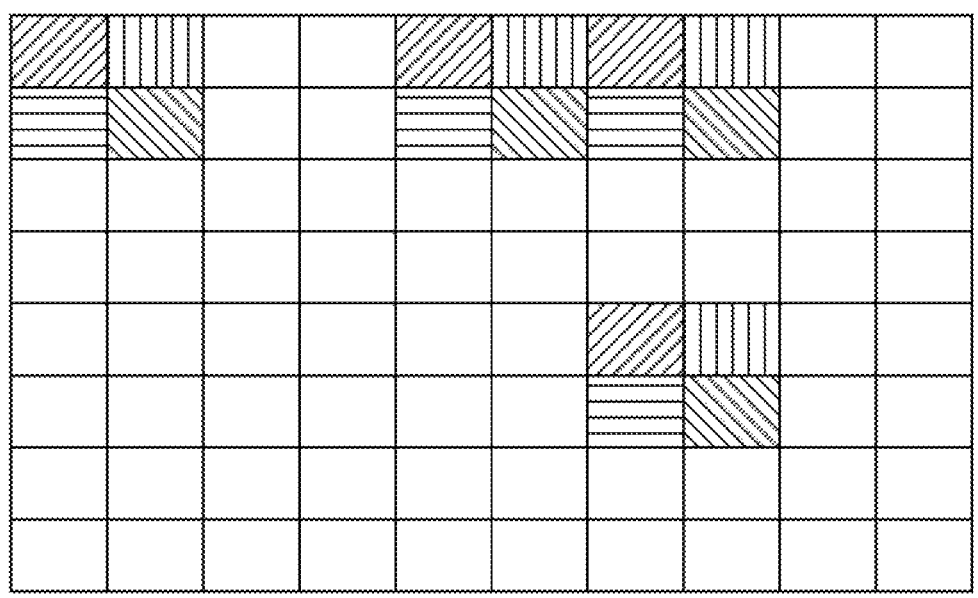

As such, the encoder 100 can follow steps 1002 and 1004 to review each contiguous non-overlapping region of intra prediction blocks 202 of a particular size in the picture 106, finalizing those regions that have a heterogeneity index above the predefined threshold value as four separate blocks 202 in step 1006. By way of non-limiting example, FIG. 14 depicts an exemplary picture 106 after the encoder 100 has examined each four block group. In the example of FIG. 14, the filled-in blocks 202 have been finalized at their original 8×8 size, while finalization of the empty blocks 202 has been deferred until a later step.

At step 1012, the encoder 100 can review the costs of individually encoding multiple sub-regions within each region of a particular size with their own intra prediction modes against encoding those sub-regions together as a unified region with a shared intra prediction mode found for the unified region. In some embodiments, the encoder 100 can calculate a rate-distortion cost, SATD value, SAD value, SSD value, or any other type of cost value that compares the original pixels against predicted pixels, for both compared scenarios. In some situations a region's sub-regions can be individual blocks 202. By way of a non-limiting example, when the encoder 100 considers a 16×16 region, the sub-regions can be each individual 8×8 block 202 within the region. In other situations, such as when progressively larger region sizes are considered as described below, a region's sub-regions can be smaller regions that themselves contain multiple blocks 202. By way of a non-limiting example, when the encoder 100 considers a 32×32 region, the sub-regions within it can each be 16×16 regions that themselves each contain four 8×8 blocks 202.

If at step 1012 the encoder 100 finds that the cost of separately encoding sub-regions within a region is less than the cost of encoding the sub-regions together as a unified region, the encoder 100 can move to step 1014 and finalize the region as four sub-regions that can be separately encoded using their own intra prediction modes.

However, if at step 1012 the encoder 100 finds that the cost of separately encoding sub-regions within a region is not less than the cost of encoding the sub-regions together as a unified region, the encoder 100 can determine at step 1016 whether the region could be combined with neighboring regions that have not yet been finalized. If at step 1016 the encoder 100 finds that the region is bordered by one or more other regions that have already been finalized at the same or a smaller size such that the region could not be combined with them as part of a larger non-finalized region, the encoder 100 can finalize the region at the combined size at step 1018.

Figure 15:
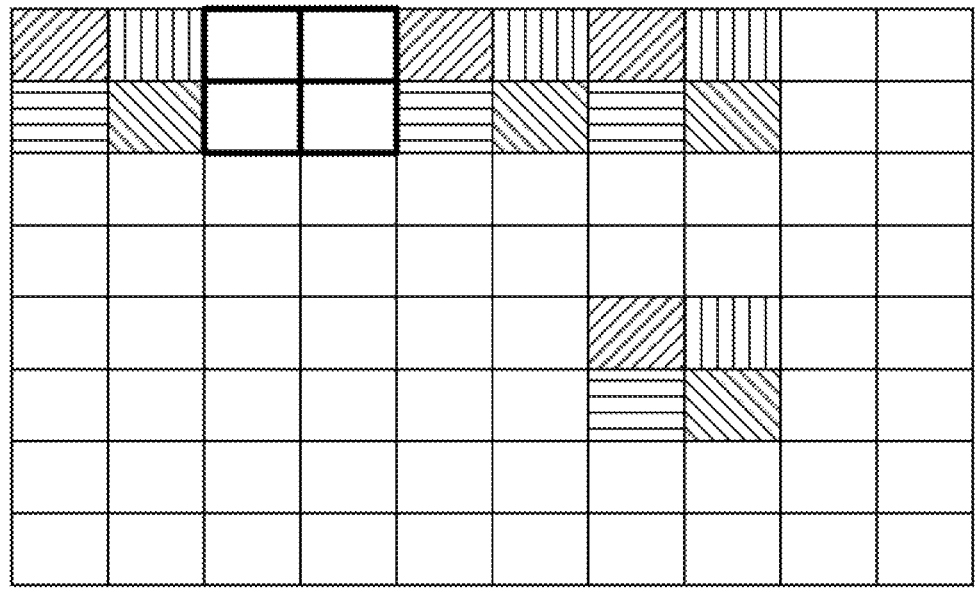
Figure 16:
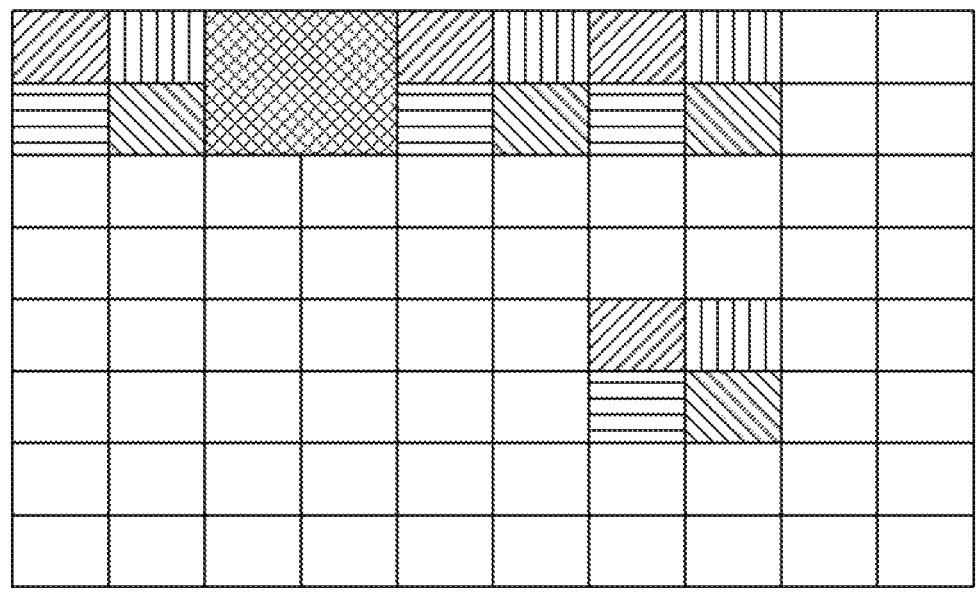

By way of a non-limiting example, FIG. 15 depicts a region of four blocks 202 that is positioned between other finalized regions. As described above with respect to FIG. 13, in this example the heterogeneity index of this region of blocks 202 was not above the predefined threshold value, and as such the blocks 202 were not finalized at their original 8×8 size during step 1006. Accordingly, the encoder 100 can now at step 1012 compare the costs of encoding the four 8×8 blocks 202 separately as four sub-regions against the cost of encoding them as a single 16×16 region. In this example, the encoder 100 can find that the cost of encoding the four 8×8 blocks in the region separately exceeds the cost of encoding them as a single 16×16 region. As the 16×16 region is bordered on the left and right by blocks 202 that have already been finalized, the encoder 100 can determine that its blocks 202 cannot be further considered at larger region sizes, and it can accordingly finalize the region for encoding at step 1018 as a combined 16×16 region as shown in FIG. 16.

Figure 17:
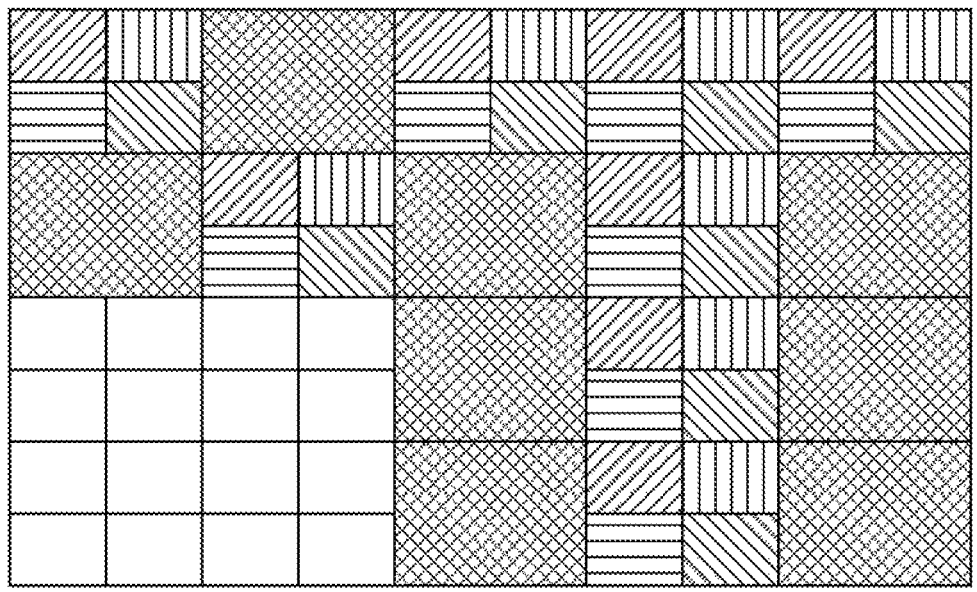

However, if at step 1016 the encoder 100 finds that the region could potentially be combined with neighboring non-finalized regions, the encoder can defer finalization of the region until the encoder further compares the costs of encoding the neighboring non-finalized regions separately against the costs of encoding them as a combined region at the next larger region size. By way of a non-limiting example, FIG. 17 depicts the picture 106 in a state in which the four 16×16 regions at the lower left corner were found to have lower encoding costs if they were encoded as 16×16 regions rather than being encoded as individual 8×8 blocks 202. However, in this example the encoder 100 avoided finalization of the regions as 16×16 regions because the 16×16 regions bordered other 16×16 regions that were also not finalized, and as such the potential exists to combine them into a larger 32×=region.

Figure 18:
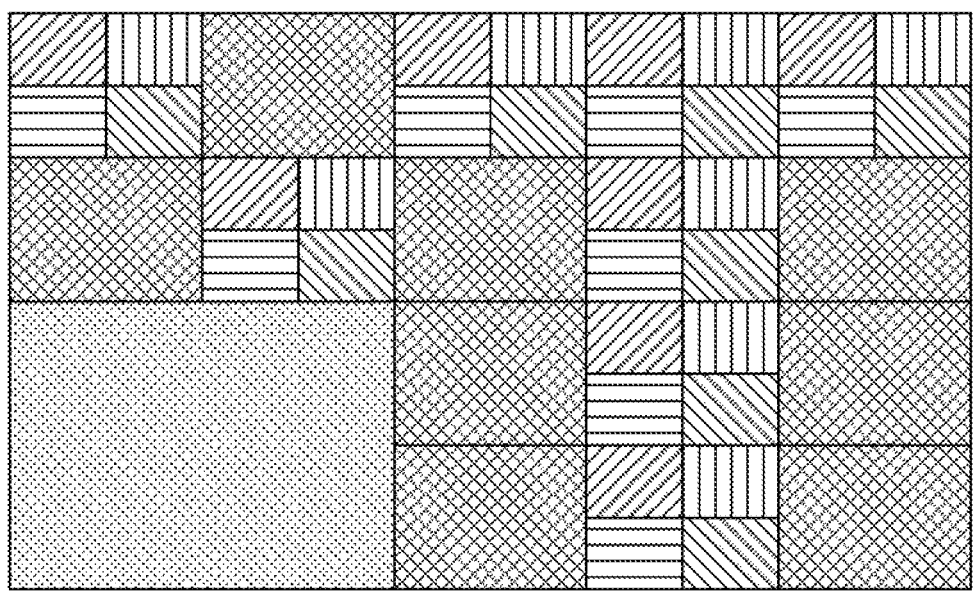

After the encoder 100 makes a full pass of each non-finalized region of a particular size and has either finalized as separate sub-regions at step 1014, finalized as a combined region at step 1018, or deferred finalization pending review at a larger region size, the encoder 100 can determine at step 1020 whether any regions remain that have not yet been finalized. If all regions have been finalized, the encoder 100 can move on to other portions of the overall encoding process. However, if some non-finalized regions remain, such as the non-finalized regions at the bottom left corner region shown in FIG. 17, the encoder 100 can increase the region size under consideration at step 1022 and return to step 1012 to further consider the costs of encoding each remaining region separately as individual sub-regions or together as a larger region. By way of a non-limiting example, when the picture 106 is in the state shown in FIG. 17 the encoder 100 can move to a 32×=region size after performing a pass at a 16×16 region size, and consider the costs of encoding the 16×16 regions individually against the costs of encoding them as a single 32×=region. If the cost of encoding them at a combined larger size is less than encoding them separately, the 16×16 regions can be combined into a single 32×=region as shown in FIG. 18.

As shown in the examples described above, an encoder 100 can begin a first pass at step 1012 to review non-finalized 16×16 regions. If any 16×16 regions have not been yet been finalized after that first pass, the encoder 100 can make another pass that considers the costs of encoding each 16×16 region separately against combining four of them into a larger 32×=region and encoding that larger region using a shared intra prediction mode. In some embodiments, the 32×=region size can be the largest considered and any remaining can be finalized at that size, while in other embodiments the encoder 100 can do further passes for 64×64 regions or any other larger region size if neighboring sub-regions that could be combined into those regions have not been finalized after a pass.

Different exemplary test embodiments comprising some or all of the steps presented above have been implemented and tested against a reference encoding scheme. In the test embodiments, methods for selection the intra prediction mode were used on the luma (luminance) channel, and the chroma mode was derived based on the luma intra prediction mode. The reference encoding scheme that the test embodiments were compared against performs rough estimation of the cost of all 35 HEVC intra prediction modes for a block using SATD based on Hadamard transforms, and then reviews 3 or 8 best candidates more closely at multiple block sizes by finding full rate-distortion costs to identify the best intra prediction mode.

Exemplary test embodiment A follows the steps of FIG. 6 to progressively narrow down to the best intra prediction mode for each block 202. As shown in FIG. 19, when tested against the reference encoding scheme, test embodiment A provided an average savings of 49% in the number of mode evaluation operations and 51% in the time taken for intra mode decisions when the intra mode decision is made at a 16×16 block size, and an average savings of 48.6% in the number of mode evaluations operations and 74.8% in the time taken for intra mode decisions when the intra mode decision is made at a 32×=block size.

Exemplary test embodiment B begins with intra prediction modes found for each block 202 using an alternative to the steps of FIG. 6. By way of a non-limiting example, it can assign initial intra prediction modes to each block 202 using a different embodiment without use of FIG. 6's progressive selection method. Test embodiment B then uses those initial intra prediction modes to follow at least some of the steps of FIG. 10 to calculate heterogeneity indexes and thereby finalize at least some of the blocks 202 at an early stage, such that they are not reviewed at larger region sizes. In this embodiment, the intra prediction modes for remaining non-finalized blocks 202 can be found through a process similar to the reference encoding scheme, in which the full 35 HEVC intra prediction modes are roughly evaluated to find 3 or 8 candidate modes, and then the candidates are reviewed again to find the one with the lowest rate-distortion cost. As shown in FIG. 20, when tested against the reference encoding scheme, test embodiment B provided an average savings of 20.1% in the number of rate-distortion cost operations and 38.8% in the time taken for intra mode decisions when the intra mode decision is made at a 16×16 block size, and an average savings of 66.1% in the number of rate-distortion cost operations and 74% in the time taken for intra mode decisions when the intra mode decision is made at a 32×=block size.

Exemplary test embodiment C begins with intra prediction modes found for each block 202 using an alternative to the steps of FIG. 6. By way of a non-limiting example, it can assign initial intra prediction modes to each block 202 using a different embodiment without use of FIG. 6's progressive selection method. Test embodiment C then uses those initial intra prediction modes to follow at least some of the steps of FIG. 10 to calculate heterogeneity indexes and thereby finalize at least some of the blocks 202 at an early stage, such that they are not reviewed at larger region sizes. In this embodiment, the intra prediction modes for remaining non-finalized blocks 202 are found by roughly evaluating each of the 35 HEVC intra prediction modes and then selecting the one with the lowest rough cost estimate as the one to use for each block size. As shown in FIG. 21, when tested against the reference encoding scheme, test embodiment C provided an average savings of 74.3% in the number of rate-distortion cost operations and 67% in the time taken for intra mode decisions when the intra mode decision is made at a 16×16 block size, and an average savings of 88.9% in the number of rate-distortion cost operations and 85.8% in the time taken for intra mode decisions when the intra mode decision is made at a 32×=block size.

Exemplary test embodiment D follows the steps of FIG. 6 to progressively narrow down to the best intra prediction mode for each block 202, and then follows at least some of the steps of FIG. 10A to finalize at least some of the blocks 202 earlier such that they are not reviewed at larger region sizes. Similar to exemplary test embodiment D, in this embodiment the intra prediction modes for remaining non-finalized blocks 202 are found by roughly evaluating each of the 35 HEVC intra prediction modes and then selecting the one with the lowest rough cost estimate as the one to use for each block size.

Figures 22, 23:
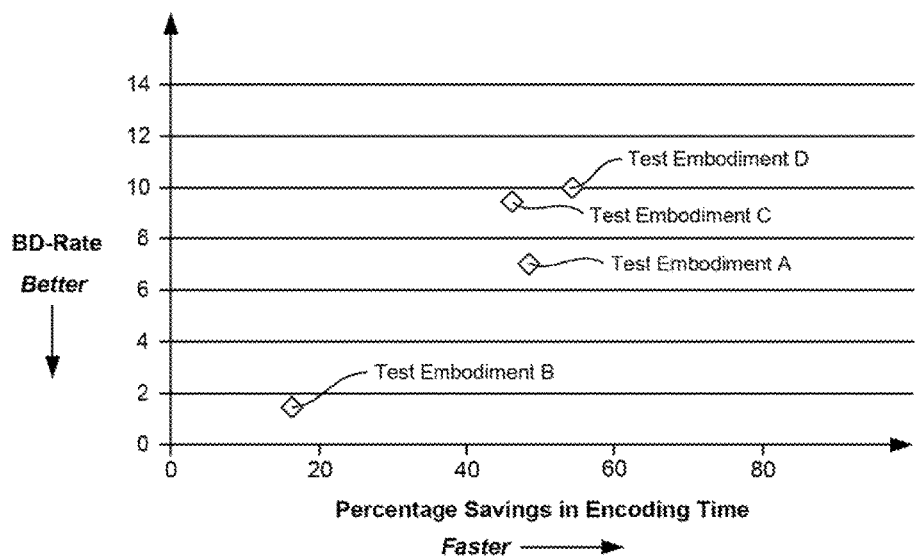
FIG. 22 depicts experimentally determined BD-rate savings for four test embodiments compared with a reference encoder.
FIG. 23 depicts a graph plotting experimentally determined BD-rate savings for four test embodiments against their savings in encoding time.
Figure 24:
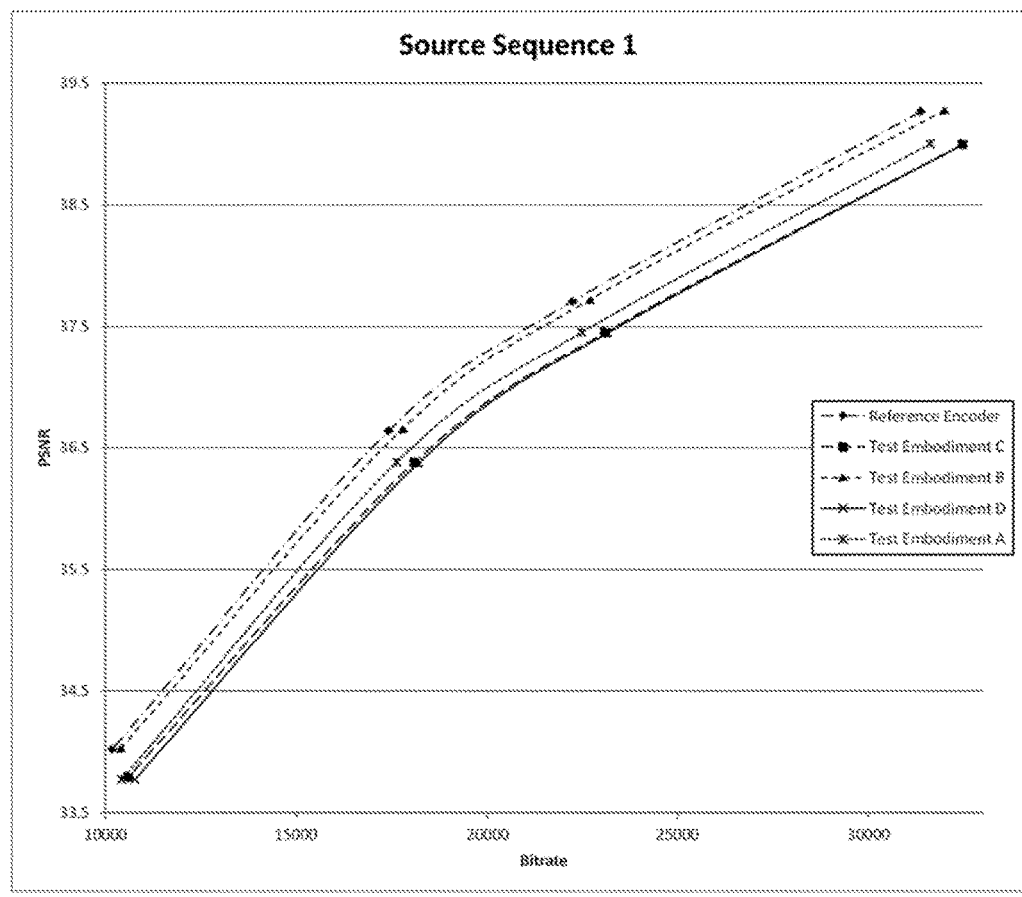
FIGS. 24-28 depicts comparisons of the peak signal-to-noise ratio for a reference encoding scheme and each of four test embodiments at various bitrate on five different source sequences.
Figure 25:
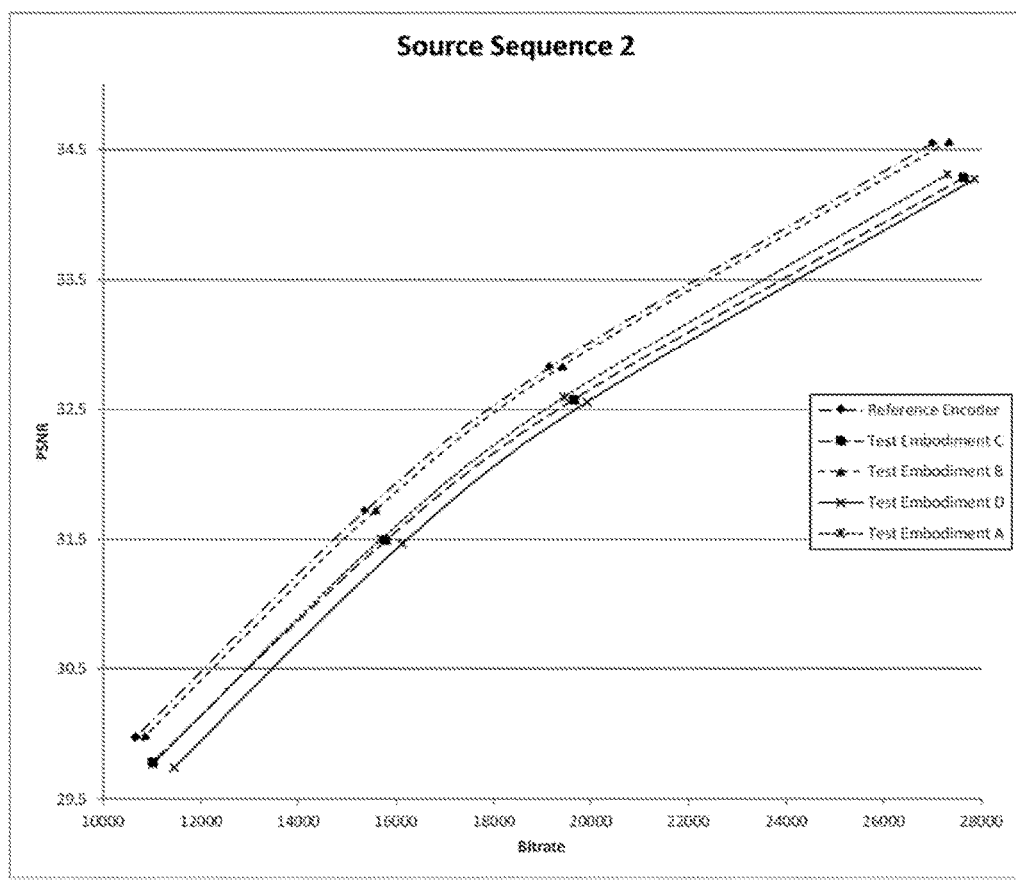
Figure 26:
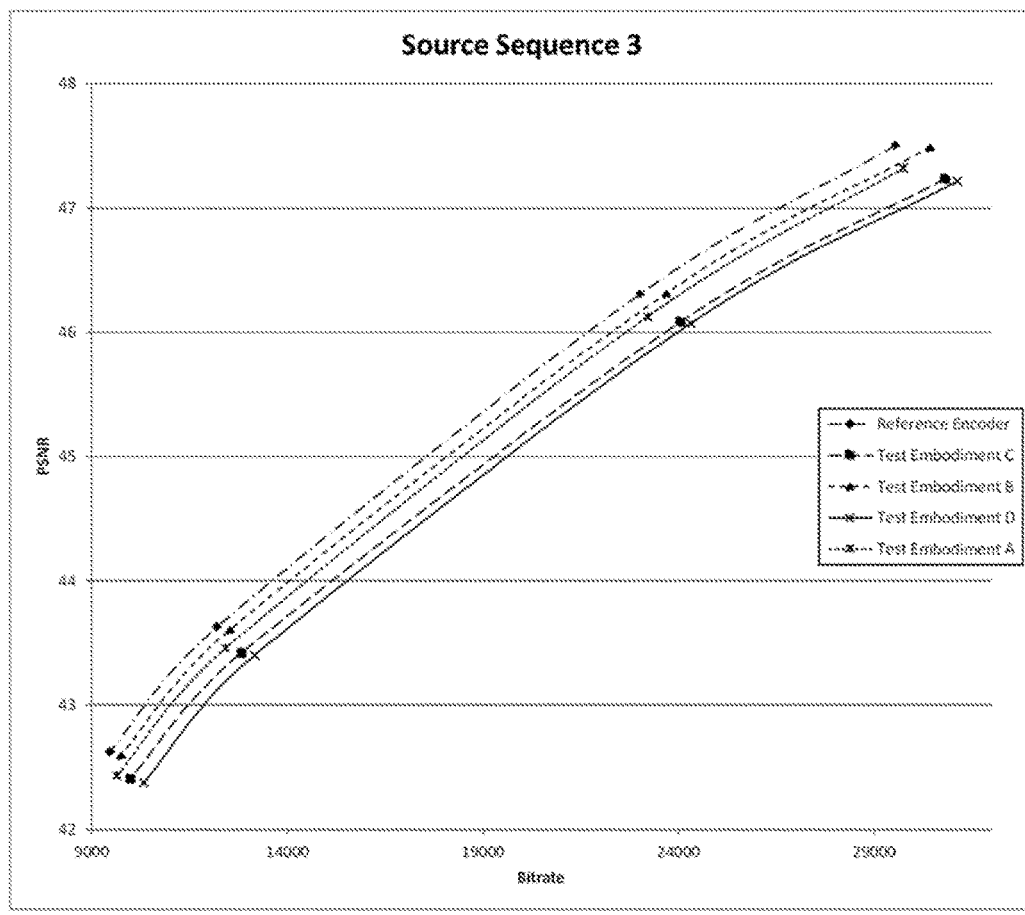
Figure 27:
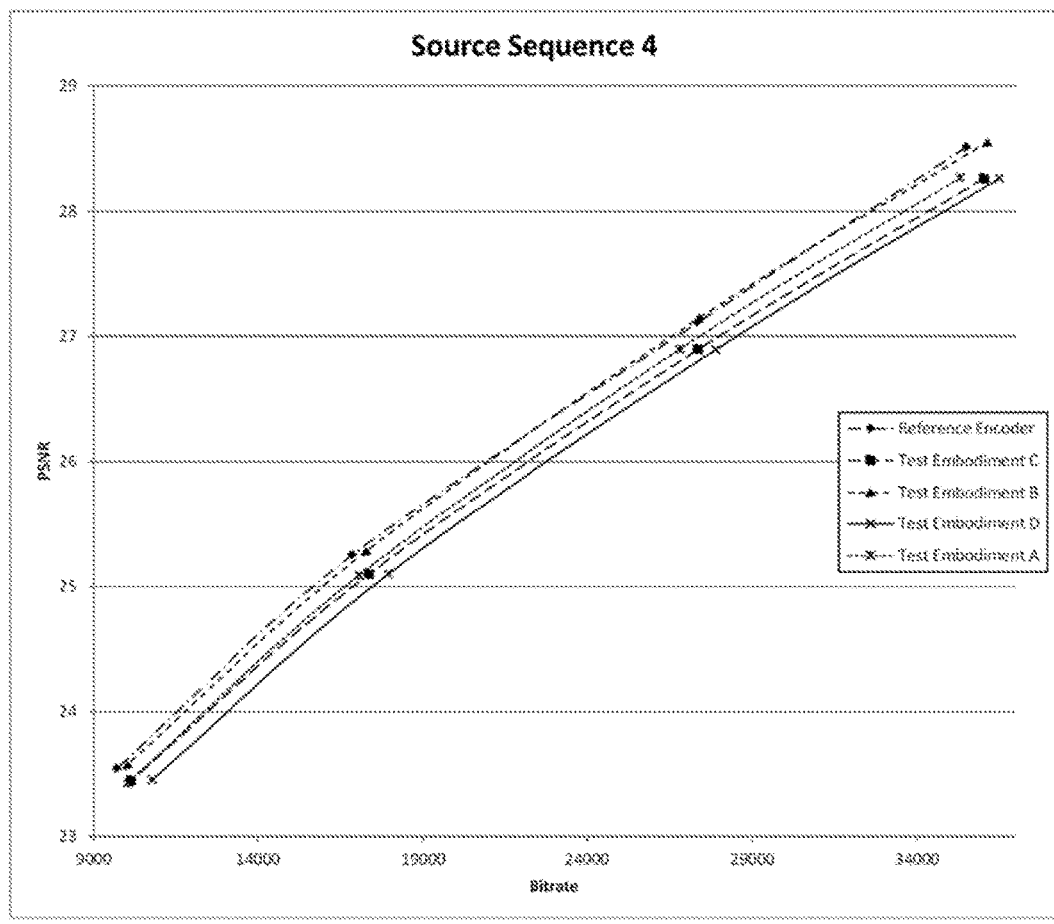
Figure 28:
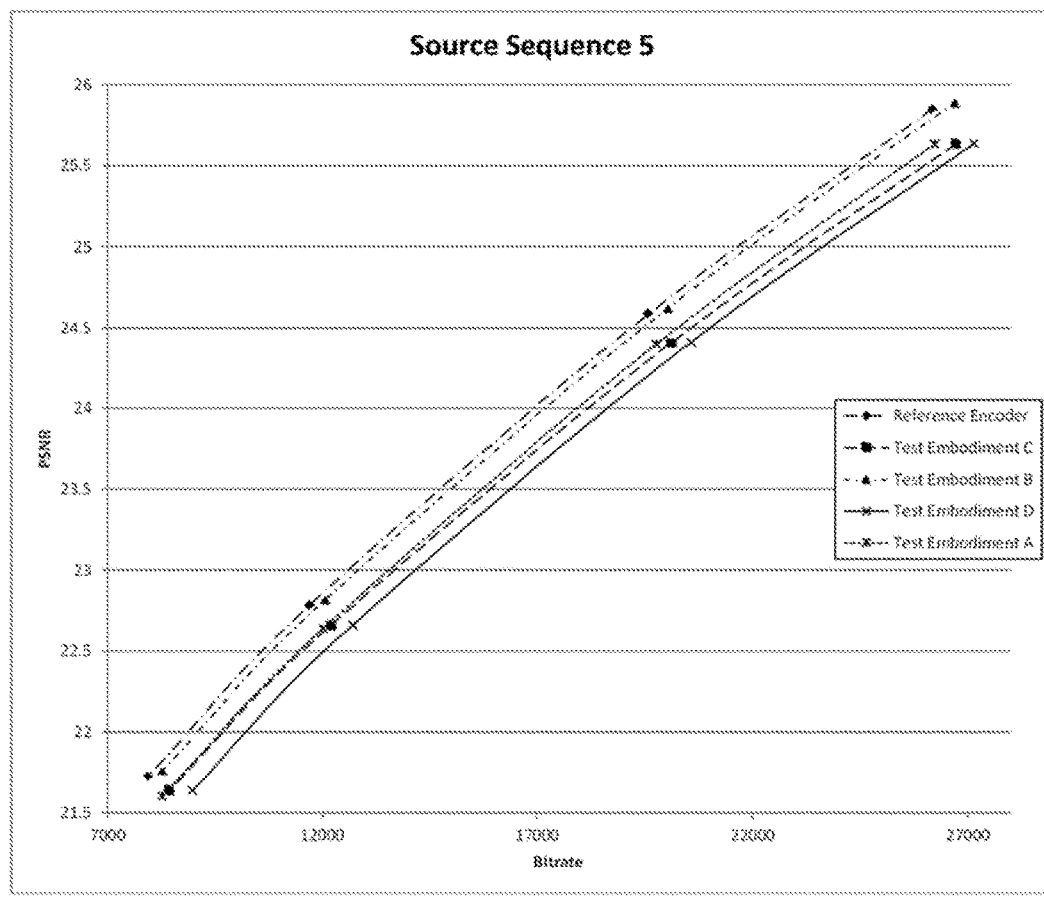

FIG. 22 depicts experimentally determined Bjntegaard-Delta bit-rate (BD-rate) savings for the four test embodiments, relative to the reference encoding scheme for different source sequences, as well as the overall encoding complexity savings. FIG. 23 depicts a chart that compares the BD-rate of each of the four test embodiments relative to the savings in their encoding time. FIGS. 24-28 depicts a comparison of the peak signal-to-noise ratio for the reference encoding scheme and each of the four test embodiments at various bitrate on five different source sequences. As can be seen from these figures, the test embodiments can produce encoded images at a substantially similar quality level to the reference encoding scheme, but with notable savings in the number of operations performed and time taken to select intra prediction modes.

Although the present invention has been described above with particularity, this was merely to teach one of ordinary skill in the art how to make and use the invention. The techniques described above with respect to H.265/HEVC can be also used in other video coding techniques, such as VP9 and beyond. Many additional modifications will fall within the scope of the invention, as that scope is defined by the following claims.

The invention claimed is:

1. A method of encoding a digital video with a video encoder, comprising:
    loading a picture comprising a plurality of pixels;
    arranging said plurality of pixels into a plurality of intra prediction blocks and/or inter prediction blocks;
    dividing the pixels of each intra prediction block into a first group, a second group, a third group, and a fourth group based on phases of the pixels;
    for each intra prediction block, loading an initial list of intra prediction modes;
    at a first stage for each intra prediction block, calculating a first stage cost value for each of the intra prediction modes on said initial list for said first group, calculating a first stage threshold maximum cost, and generating a first stage mode list by copying each intra prediction mode on said initial mode list that has a first stage cost value that is less than said first stage threshold maximum cost;
    at a second stage for each intra prediction block, calculating a second stage cost value for each of the intra prediction modes on said first stage mode list for said second group, calculating a second stage threshold maximum cost, and generating a second stage mode list by copying each intra prediction mode on said first stage mode list that has a second stage cost value that is less than said second stage threshold maximum cost;
    at a third stage for each intra prediction block, calculating a third stage cost value for each of the intra prediction modes on said second stage mode list for said third group, calculating a third stage threshold maximum cost, and generating a third stage mode list by copying each intra prediction mode on said second stage mode list that has a third stage cost value that is less than said third stage threshold maximum cost;
    at a fourth stage for each intra prediction block, calculating a fourth stage cost value for each of the intra prediction modes on said third stage mode list for said fourth group;
    for each intra prediction block, selecting the intra prediction mode on said third stage mode list with the lowest fourth stage cost value as a tentative intra prediction mode for the intra prediction block;

calculating a heterogeneity index for each group of contiguous intra prediction blocks in said picture, based on the tentative intra prediction mode selected for each intra prediction block after said fourth stage; and finalizing the tentative intra prediction mode for each intra prediction block within each group of contiguous intra prediction blocks that has a heterogeneity index above a predetermined threshold value.

2. The method of claim 1, wherein:

said first stage cost value for an intra prediction mode is calculated as the sum of the absolute transformed differences or the sum of absolute differences between the first group's original pixels and the predicted pixels using the intra prediction mode, plus a bitrate factor equaling a bitrate multiplied by a Lagrange multiplier based on a quantization parameter when the intra prediction mode is identified as a most probable mode, and wherein said first stage threshold maximum cost is calculated as the minimum first stage cost value across all intra prediction modes on said initial mode list plus a first parameter that is less than one multiplied by the range of first stage cost values.

3. The method of claim 2, wherein:

said second stage cost value, said third stage cost value, and said fourth stage cost value for an intra prediction mode are calculated as the sum of the absolute transformed differences or the sum of absolute differences between the associated group's original pixels and the predicted pixels using the intra prediction mode, plus a cost value for the preceding stage, plus said bitrate factor when the intra prediction mode is identified as a most probable mode, wherein said second stage threshold maximum cost is calculated as the minimum second stage cost value across all intra prediction modes on said first stage mode list, plus a positive second parameter that is less than said first parameter multiplied by the range of first stage cost values, and wherein said third stage threshold maximum cost is calculated as the minimum third stage cost value across all intra prediction modes on said second stage mode list, plus a positive third parameter that is less than said second parameter multiplied by the range of first stage cost values.

4. The method of claim 1, wherein each group of contiguous intra prediction blocks is a region of four intra prediction blocks arranged two blocks wide and two blocks high, and the heterogeneity index for a group is calculated by summing the differences between the intra prediction modes of the top and bottom intra prediction blocks in the left column of the group, the differences between the intra prediction modes of the top and bottom intra prediction blocks in the right column of the group, the differences between the intra prediction modes of the left and right intra prediction blocks in the top row of the group, and the differences between the intra prediction modes of the left and right intra prediction blocks in the bottom row of the group.

5. The method of claim 4, further comprising comparing the rate distortion costs of encoding the four intra prediction blocks within each group that had a heterogeneity index that was not above said predetermined threshold value against the costs of encoding the four intra prediction blocks as a unified region, and selecting the arrangement with the lower rate distortion cost.

* * * * *